(12) United States Patent
Schneider et al.

(10) Patent No.: US 10,150,712 B2
(45) Date of Patent: Dec. 11, 2018

(54) COMPOSITIONS WITH IMPROVED UREASE-INHIBITING EFFECT COMPRISING (THIO)PHOSPHORIC ACID TRIAMIDE AND FURTHER COMPOUNDS

(71) Applicant: BASF SE, Ludwigshafen (DE)

(72) Inventors: Karl-Heinrich Schneider, Kleinkarlbach (DE); Claudia Klodwig, Hessheim (DE); Gregor Pasda, Neustadt (DE); Alexander Wissemeier, Speyer (DE); Daniella Lohe, Limburgerhof (DE); Achim Reddig, Lambrecht (DE); Christian Carlos Miyagawa, Schriesheim (DE); Wolfram Zerulla, Maikammer (DE); Steffen Tschirschwitz, Mannheim (DE); Ralf-Thomas Rahn, Mannheim (DE); Ansgar Gereon Altenhoff, Heidelberg (DE); Stephan Hüffer, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 36 days.

(21) Appl. No.: 14/902,181

(22) PCT Filed: Jun. 27, 2014

(86) PCT No.: PCT/IB2014/062667
§ 371 (c)(1),
(2) Date: Dec. 30, 2015

(87) PCT Pub. No.: WO2015/001457
PCT Pub. Date: Jan. 8, 2015

(65) Prior Publication Data
US 2017/0158575 A1    Jun. 8, 2017

(30) Foreign Application Priority Data

Jul. 4, 2013 (WO) .................. PCT/IB2013/055483
Jul. 4, 2013 (WO) .................. PCT/IB2013/055484
Jul. 4, 2013 (WO) .................. PCT/IB2013/055486

(51) Int. Cl.
*C05C 9/00*        (2006.01)
*C05G 3/00*        (2006.01)
(Continued)

(52) U.S. Cl.
CPC .................. *C05G 3/08* (2013.01); *C05C 9/00* (2013.01); *C05C 9/005* (2013.01); *C05C 11/00* (2013.01);
(Continued)

(58) Field of Classification Search
None
See application file for complete search history.

(56) References Cited

U.S. PATENT DOCUMENTS 5,352,265 A * 10/1994 Weston ............. C05C 9/00
                                                  71/29
5,364,438 A * 11/1994 Weston ............. C05C 1/00
                                                  71/29
(Continued)

FOREIGN PATENT DOCUMENTS

CN      1204310       1/1999
CN      101945837     1/2011
(Continued)

OTHER PUBLICATIONS

International Search Report dated Mar. 5, 2015, prepared in International Application No. PCT/IB2014/062667.
(Continued)

*Primary Examiner* — Wayne A Langel
(74) *Attorney, Agent, or Firm* — Brinks Gilson & Lione

(57) ABSTRACT

An composition comprising:
(A) a mixture comprising at least one (thio)phosphoric acid triamide according to the general formula (I)

$$R^1R^2N\text{---}P(X)(NH_2)_2,$$

wherein
X is oxygen or sulfur;
$R^1$ is a $C_1$ to $C_{20}$ alkyl, $C_3$ to $C_{20}$ cycloalkyl, $C_6$ to $C_{20}$ aryl, or dialkylaminocarbonyl group;
$R^2$ is H, or
$R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
and
(C) at least one amine selected from the group consisting of
(C1) a polymeric polyamine, and
(C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$, and
(C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$, and
(C4) an amine containing at least one saturated or unsaturated $C_8$ to $C_{40}$ alkyl group $R^{23}$, and
(C5) a saturated or unsaturated heterocyclic amine which contains at least one oxygen atom as ring atom and which does not contain a further alkoxy group.

20 Claims, No Drawings

(51) Int. Cl.
*C05G 3/08* (2006.01)
*C09K 15/30* (2006.01)
*C05C 11/00* (2006.01)
*C09K 15/10* (2006.01)
*C09K 15/26* (2006.01)
*C09D 5/00* (2006.01)
*C09D 179/02* (2006.01)
*C09K 15/06* (2006.01)
*C09K 15/18* (2006.01)
*C09K 15/22* (2006.01)
*C09K 15/28* (2006.01)

(52) U.S. Cl.
CPC ......... *C05G 3/0029* (2013.01); *C05G 3/0041* (2013.01); *C09D 5/00* (2013.01); *C09D 179/02* (2013.01); *C09K 15/06* (2013.01); *C09K 15/10* (2013.01); *C09K 15/18* (2013.01); *C09K 15/22* (2013.01); *C09K 15/26* (2013.01); *C09K 15/28* (2013.01); *C09K 15/30* (2013.01)

(56) References Cited

U.S. PATENT DOCUMENTS

| | | | |
|---|---|---|---|
| 5,698,003 A | 12/1997 | Omilinsky et al. | |
| 8,048,189 B2* | 11/2011 | Whitehurst | C05B 17/00 564/12 |
| 8,075,659 B2 | 12/2011 | Wissemeier et al. | |
| 8,603,211 B2 | 12/2013 | Rahn et al. | |
| 9,090,516 B2* | 7/2015 | Roberts | C05G 3/00 |
| 9,266,789 B2* | 2/2016 | Ortiz-Suarez | C05G 3/08 |
| 9,512,045 B2* | 12/2016 | Sutton | C05C 9/00 |
| 2004/0175407 A1* | 9/2004 | McDaniel | A62D 3/02 424/423 |
| 2010/0206031 A1 | 8/2010 | Whitehurst et al. | |
| 2011/0154874 A1* | 6/2011 | Rahn | C05C 9/005 71/21 |
| 2011/0296886 A1* | 12/2011 | Gabrielson | C05C 3/00 71/29 |
| 2013/0145806 A1 | 6/2013 | Leahann et al. | |
| 2014/0060132 A1* | 3/2014 | Roberts | C05G 3/00 71/28 |

FOREIGN PATENT DOCUMENTS

| | | |
|---|---|---|
| EP | 2 880 004 | 6/2015 |
| JP | 2005-022912 A | 1/2005 |
| JP | 2008-156243 A | 7/2008 |
| WO | WO 2007/093528 | 8/2007 |
| WO | WO 2014/022174 | 2/2014 |
| WO | WO 2015/020967 | 2/2015 |

OTHER PUBLICATIONS

International Preliminary Report on Patentability dated Jan. 5, 2016, prepared in International Application No. PCT/IB2014/062667.
Supplementary European Search Report co,pleted Feb. 2, 2017, prepared in European Patent Application No. 14819297.4.
EPA Fact Sheet: N-Methylpyrrolidone (NMP) https://www.epa.gov/assessing-and-managing-chemicals-under-tsca/fact-sheet-n-methylpyrr . . . Last Updated on Jan. 12, 2017.

* cited by examiner

COMPOSITIONS WITH IMPROVED UREASE-INHIBITING EFFECT COMPRISING (THIO)PHOSPHORIC ACID TRIAMIDE AND FURTHER COMPOUNDS

This application is a National Stage application of International Application No. PCT/IB2014/062667, filed Jun. 27, 2014, which claims the benefit of International Application No. PCT/IB2013/055484, filed Jul. 4, 2013; International Application No. PCT/IB2013/055486, filed Jul. 4, 2013; and International Application No. PCT/IB2013/055483, filed Jul. 4, 2013.

FIELD OF THE INVENTION

This invention essentially relates to compositions with improved urease-inhibiting effect comprising (thio)phosphoric acid triamide and further compounds and the use of such compositions as additive or coating material for nitrogen-containing fertilizers.

DESCRIPTION OF THE PRIOR ART

Worldwide, the predominant and further-increasing amount of the nitrogen used for fertilizing is employed in the form of urea or urea-containing fertilizers. Urea itself, however, is a form of nitrogen which is absorbed very little if at all, being hydrolyzed relatively rapidly by the enzyme urease, which is present ubiquitously in the soil, to form ammonia and carbon dioxide. In this process, in certain circumstances, gaseous ammonia is emitted to the atmosphere, and is then no longer available in the soil for the plants, thereby lowering the efficiency of fertilization.

It is known that the degree of utilization of the nitrogen when using urea-containing fertilizers can be improved by spreading urea-containing fertilizers together with substances which are able to inhibit or decrease the enzymatic cleavage of urea (for a general review, see Kiss, S. Simihäian, M. (2002) Improving Efficiency of Urea Fertilizers by Inhibition of Soil Urease Activity, ISBN 1-4020-0493-1, Kluwer Academic Publishers, Dordrecht, The Netherlands). Among the most potent known urease inhibitors are N-alkylthiophosphoric acid triamides and N-alkylphosphoric acid triamides, which are described in EP 0 119 487, for example.

Additionally, mixtures of N-alkylthiophosphoric acid triamides such as N-(n-butyl)thiophosphoric acid triamide (NBPT) and N-(n-propyl)thiophosphoric acid triamide (NPPT) can be used. The mixtures and their preparation are described in US 2010/218575 A1, for example.

These urease inhibitors are described in U.S. Pat. No. 4,530,714, for example. In order for this class of compound to be able to act as a urease inhibitor, there must first be a conversion to the corresponding oxo form. That form reacts subsequently with the urease, causing its inhibition.

It is advisable to apply the urease inhibitors together with the urea onto or into the soil, since this ensures that the inhibitor comes into contact, together with the fertilizer, with the soil. The urease inhibitor may be incorporated in the urea by, for example, dissolving it into the melt prior to urea granulation or prilling. A process of this kind is described in U.S. Pat. No. 5,352,265, for example. A further option is to apply the urease inhibitor to the urea granules or prills, in the form of a solution, for example.

Corresponding processes for application, and suitable solvents, are described in US 2010/218575 A1, for example. Other suitable additives, for example amines selected from methyldiethanolamine, tetrahydroxypropylethylenediamine, trimethylaminoethylethanolamine, N,N,N',N'-tetramethyl-1,6-hexanediamine, N,N',N"-tris(dimethylaminopropyl)hexahydrotriazine, and 2,2'-dimorpholinyldiethyl ether, are described in US 2011/0154874 A1.

The storage life of the urease inhibitor is limited. The higher the temperature, the shorter the storage life. If, for example, urea is stored under tropical conditions, a major part of the urease inhibitor has undergone decomposition, generally, after about four weeks of storage. If the urease inhibitor is introduced into the urea melt, the decomposition is less. For the commercialization of the urea stabilized with the urease inhibitor, however, it is often vital to apply the urease inhibitor to urea and to store the treated fertilizer until the time of its spreading to the soil.

OBJECTS OF THE INVENTION

One of the objects of the present invention was to provide a composition containing (thio)phosphoric acid triamide which
  (i) enhances the stability of the (thio)phosphoric acid triamide(s), and/or
  (ii) has a relatively long storage life, particularly before being applied to or coated on nitrogen-containing fertilizers, and/or
  (iii) enhances the stability of the (thio)phosphoric acid triamide particularly when applied to or coated on nitrogen-containing fertilizers such as urea, and/or
  (iv) protects the (thio)phosphoric acid triamide applied to or coated on nitrogen-containing fertilizers such as urea from decomposition or loss, and/or
  (v) is toxicologically unobjectionable, and/or
  (vi) does not adversely affect the urease-inhibiting effect and/or activity of the (thio)phosphoric acid triamide, and/or
  (vii) can be easily and safely packaged, transported and shipped, even in large quantities,
  (viii) can be easily and safely handled and applied for soil treatment, even in large quantities.

SUMMARY OF THE INVENTION

Accordingly, a composition (Q1) was found which comprises:
  (A) a mixture comprising at least one (thio)phosphoric acid triamide according to the general formula (I)

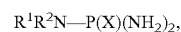

wherein
  X is oxygen or sulfur;
  is a $C_1$ to $C_{20}$ alkyl, $C_3$ to $C_{20}$ cycloalkyl, $C_6$ to $C_{20}$ aryl, or dialkylaminocarbonyl group;
  $R^2$ is H, or
  $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
  and
  (B) an aromatic alcohol according to the general formula (II).

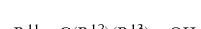

in an amount of more than 10 wt. % (wt. % stands for "percent by weight") based on the total weight of the composition (Q1), wherein
$R^{11}$ is aryl or alkylaryl;
$R^{12}$ is H or alkyl;
$R^{13}$ is H or alkyl.

Accordingly, a further composition (Q2) was found which comprises:
(A) a mixture comprising at least one (thio)phosphoric acid triamide according to the general formula (I)

$$R^1R^2N\text{---}P(X)(NH_2)_2,$$

wherein
X is oxygen or sulfur;
$R^1$ is a $C_1$ to $C_{20}$ alkyl, $C_3$ to $C_{20}$ cycloalkyl, $C_6$ to $C_{20}$ aryl, or dialkylaminocarbonyl group;
$R^2$ is H, or
$R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
and
(C) at least one amine selected from the group consisting of
(C1) a polymeric polyamine, and
(C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$, and
(C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$, and
(C4) an amine containing at least one saturated or unsaturated $C_8$ to $C_{40}$ alkyl group $R^{23}$, and
(C5) a saturated or unsaturated heterocyclic amine which contains at least one oxygen atom as ring atom and which does not contain a further alkoxy group.

Accordingly, yet a further composition (Q3) was found which comprises:
(A) a mixture comprising at least one (thio)phosphoric acid triamide according to the general formula (I)

$$R^1R^2N\text{---}P(X)(NH_2)_2,$$

wherein
X is oxygen or sulfur;
$R^1$ is a $C_1$ to $C_{20}$ alkyl, $C_3$ to $C_{20}$ cycloalkyl, $C_6$ to $C_{20}$ aryl, or dialkylaminocarbonyl group;
$R^2$ is H, or
$R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
and
(D) at least one amide according to the general formula (III)

$$R^{31}CO\text{---}NR^{32}R^{33}$$

wherein
$R^{31}CO$ is an acyl radical having 1 to 22 carbon atoms,
$R^{32}$ is hydrogen or alkyl, and
$R^{33}$ is hydrogen or alkyl, or $R^{32}$ and $R^{33}$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.

In addition, a process for treating the soil comprising applying the compositions of the invention into the soil in-furrow and/or as side dress and/or as broadcast was found.

Moreover, the use of the compositions of the invention as additive or coating material for nitrogen-containing fertilizers has been found.

Preferred embodiments are explained in the claims and the specification. It is understood that combinations of preferred embodiments are within the scope of the present invention.

The term "at least one" is to be understood as 1, 2, 3 or more. A mixture comprising at least one amine refers for example to a mixture comprising 1, 2, 3 or more amines.

The term "soil" is to be understood as a natural body comprised of living (e.g. microorganisms (such as bacteria and fungi), animals and plants) and non-living matter (e.g. minerals and organic matter (e.g. organic compounds in varying degrees of decomposition), liquid, and gases) that occurs on the land surface, and is characterized by soil horizons that are distinguishable from the initial material as a result of various physical, chemical, biological, and anthropogenic processes. From an agricultural point of view, soils are predominantly regarded as the anchor and primary nutrient base for plants (plant habitat).

The term "fertilizer" is to be understood as chemical compounds applied to promote plant and fruit growth. Fertilizers are typically applied either through the soil (for uptake by plant roots) or by foliar feeding (for uptake through leaves). The term "fertilizer" can be subdivided into two major categories: a) organic fertilizers (composed of decayed plant/animal matter) and b) inorganic fertilizers (composed of chemicals and minerals). Organic fertilizers include manure, slurry, worm castings, peat, seaweed, sewage, and guano. Green manure crops are also regularly grown to add nutrients (especially nitrogen) to the soil. Manufactured organic fertilizers include compost, blood meal, bone meal and seaweed extracts. Further examples are enzymatically digested proteins, fish meal, and feather meal. The decomposing crop residue from prior years is another source of fertility. In addition, naturally occurring minerals such as mine rock phosphate, sulfate of potash and limestone are also considered inorganic fertilizers. Inorganic fertilizers are usually manufactured through chemical processes (such as the Haber-Bosch process), also using naturally occurring deposits, while chemically altering them (e.g. concentrated triple superphosphate). Naturally occurring inorganic fertilizers include Chilean sodium nitrate, mine rock phosphate, and limestone.

"Manure" is organic matter used as organic fertilizer in agriculture. Depending on its structure, manure can be divided into liquid manure, semi-liquid manure, stable or solid manure and straw manure. Depending on its origin, manure can be divided into manure derived from animals or plants. Common forms of animal manure include feces, urine, farm slurry (liquid manure) or farmyard manure (FYM) whereas FYM also contains a certain amount of plant material (typically straw), which may have been used as bedding for animals. Animals from which manure can be used comprise horses, cattle, pigs, sheep, chickens, turkeys, rabbits, and guano from seabirds and bats. The application rates of animal manure when used as fertilizer highly depends on the origin (type of animals). Plant manures may derive from any kind of plant whereas the plant may also be grown explicitly for the purpose of plowing them in (e.g. leguminous plants), thus improving the structure and fertility of the soil. Furthermore, plant matter used as manure may include the contents of the rumens of slaughtered ruminants, spent hops (left over from brewing beer) or seaweed.

The compositions of the invention are referred to as the compositions (Q1), (Q2), and (Q3) in the following. The composition (Q1) comprises (A) and (B)—latter in an amount of more than 10 wt. % based on the total weight of (Q1)—and optionally further components as described below. The composition (Q2) comprises (A) and (C) and optionally further components as described below. The composition (Q3) comprises (A) and (D) and optionally further components as described below.

According to the invention, the compositions (Q1), (Q2), and (Q3) comprises—as one of their essential components
(A) a mixture comprising at least one (thio)phosphoric acid triamide according to the general formula (I)

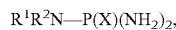

wherein
X is oxygen or sulfur;
$R^1$ is a $C_1$ to $C_{20}$ alkyl, $C_3$ to $C_{20}$ cycloalkyl, $C_6$ to $C_{20}$ aryl, or dialkylaminocarbonyl group;
$R^2$ is H, or
$R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.

X in the general formula (I) of (A) is preferably sulfur.
$R^1$ in the general formula (I) of (A) is preferably $C_1$-$C_{20}$-alkyl, more preferably $C_1$-$C_{10}$-alkyl, most preferably $C_2$-$C_7$ alkyl, for example $C_3$-$C_4$ alkyl.

Examples of alkyl groups are methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl and isodecyl. Examples of cycloalkyl groups are cyclopropyl, cyclobutyl, cyclopentyl, cyclohexyl and cyclooctyl, examples of aryl groups are phenyl or naphthyl. Examples of heterocyclic radicals $R_1R_2N—$ are piperazinyl, morpholinyl, pyrrolyl, pyrazolyl, triazolyl, oxazolyl, thiazolyl or imidazolyl groups.

According to one embodiment, (A) comprises N-n-butylthiophosphoric acid triamide (NBPT) and/or N-n-propylthiophosphoric acid triamide (NPPT), preferably NBPT and NPPT.

According to another embodiment, (A) comprises at least two different (thio)phosphoric acid triamides having structures of the general formula (I) and wherein said at least two different (thio)phosphoric acid triamides differ in at least one of radicals $R^1$ or $R^2$, and preferably, one of said at least two different (thio)phosphoric acid triamides is N-n-butylthiophosphoric acid triamide (NBPT), and more preferably, the other of said at least two different (thio)phosphoric acid triamides is selected from the group consisting of N-cyclohexyl-, N-pentyl-, N-isobutyl- and N-n-propylphosphoric acid triamide and -thiophosphoric acid triamide. Especially preferred are mixtures (A) which comprise NBPT in amounts of from 40 to 95 wt. %, most preferably from 60 to 85% wt. %, particularly preferably from 72 to 80 wt. %, in each case based on the total weight of (A).

Generally, the mixture (A) can be contained in varying amounts in the composition (Q1), (Q2), or (Q3). Preferably, the amount of (A) is not more than 85 wt. % (wt. % stands for "percent by weight"), more preferably not more than 60 wt. %, most preferably not more than 45 wt. %, most particularly preferably not more than 35 wt. %, particularly not more than 30 wt. %, for example not more than 27 wt. %, based on the total weight of the composition (Q1), (Q2), or (Q3). Preferably, the amount of (A) is at least 1 wt. %, more preferably at least 4 wt. %, most preferably at least 10 wt. %, most particularly preferably at least 15 wt. %, particularly at least 20 wt. %, for example at least 23 wt. %, based on the total weight of the composition (Q1), (Q2), or (Q3).

According to the invention, the composition (Q1) comprises—as one of its essential components
(B) an aromatic alcohol according to the general formula (II)

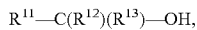

in an amount of more than 10 wt. % based on the total weight of the composition (Q1), wherein
$R^{11}$ is aryl or alkylaryl;
$R^{12}$ is H or alkyl;
$R^{13}$ is H or alkyl.

The compositions (Q2) and (Q3) can further optionally comprise
(B) an aromatic alcohol according to the general formula (II)

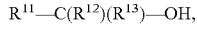

wherein
$R^{11}$ is aryl or alkylaryl;
$R^{12}$ is H or alkyl;
$R^{13}$ is H or alkyl.

The aromatic alcohol (B) is preferably used as solvent in the composition (Q1). If present, the aromatic alcohol (B) is preferably used as solvent in the compositions (Q2), or (Q3).

According to one embodiment, $R^{12}$ in the general formula (II) of (B) is $C_1$-$C_{40}$ alkyl, preferably $C_1$ to $C_{20}$ alkyl, more preferably $C_1$ to $C_{10}$ alkyl, most preferably $C_1$ to $C_5$ alkyl. According to another embodiment, $R^{13}$ in the general formula (II) of (B) is $C_1$-$C_{40}$ alkyl, preferably $C_1$ to $C_{20}$ alkyl, more preferably $C_1$ to $C_{10}$ alkyl, most preferably $C_1$ to $C_5$ alkyl.

According to another embodiment, $R^{12}$ in the general formula (II) of (B) is H. According to another embodiment, $R^{13}$ in the general formula (II) of (B) is H. According to another embodiment, $R^{13}$ in the general formula (II) of (B) is H.

According to one embodiment, R11 in the general formula (II) of (B) is aryl. According to another embodiment, $R^{11}$ in the general formula (II) of (B) is phenyl, naphthyl, pyridyl, or pyrrolyl, pyrazolyl, triazolyl, oxazolyl, thiazolyl or imidazolyl. According to another embodiment, $R^{11}$ in the general formula (II) of (B) is phenyl.

According to one embodiment, (B) is benzyl alcohol.

Generally, the aromatic alcohol (B) can be contained in any amounts greater than 10 wt. % in the composition (Q1) based on the total weight of the composition (Q1). Preferably, the amount of (B) is not more than 99 wt. % (wt. % stands for "percent by weight"), more preferably not more than 93 wt. %, most preferably not more than 87 wt. %, most particularly preferably not more than 80 wt. %, particularly not more than 75 wt. %, for example not more than 70 wt. %, based on the total weight of the composition (Q1). Preferably, the amount of (B) is at least 13 wt. %, more preferably at least 20 wt. %, most preferably at least 35 wt. %, most particularly preferably at least 45 wt. %, particularly at least 55 wt. %, for example at least 60 wt. %, based on the total weight of the composition (Q1).

According to another embodiment, the amount of (B) is preferably not more than 78 wt. %, more preferably not more than 67 wt. %, most preferably not more than 61 wt. %, most particularly preferably not more than 56 wt. %, particularly not more than 53 wt. %, for example not more than 50 wt. %, based on the total weight of the composition (Q1). Preferably, the amount of (B) is at least 16 wt. %, more preferably at least 21 wt. %, most preferably at least 26 wt. %, most particularly preferably at least 30 wt. %, particularly at least 37 wt. %, for example at least 40 wt. %, based on the total weight of the composition (Q1).

If present, the aromatic alcohol (B) can generally be contained in varying amounts in the composition (Q2) or (Q3). If present, the amount of (B) is preferably not more than 95 wt. % (wt. % stands for "percent by weight"), more preferably not more than 80 wt. %, most preferably not more than 70 wt. %, most particularly preferably not more than 60 wt. %, particularly not more than 55 wt. %, for example not more than 50 wt. %, based on the total weight of the composition (Q2) or (Q3). If present, the amount of (B) is preferably at least 6 wt. %, more preferably at least 13 wt. %, most preferably at least 21 wt. %, most particularly preferably at least 30 wt. %, particularly at least 35 wt. %, for example at least 40 wt. %, based on the total weight of the composition (Q2), or (Q3).

According to the invention, the composition (Q2) comprises—as one of its essential components—and the compositions (Q1) and (Q3) can further comprise—as one of its optional components (C) at least one amine selected from the group consisting of
  (C1) a polymeric polyamine, and
  (C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$, and
  (C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$, and
  (C4) an amine containing at least one saturated or unsaturated $C_8$ to $C_{40}$ alkyl group $R^{23}$, and
  (C5) a saturated or unsaturated heterocyclic amine which contains at least one oxygen atom as ring atom and which does not contain a further alkoxy group.

Generally, the amine(s) (C) can be contained in varying amounts in the composition (Q2). Preferably, the amount of (C) is not more than 90 wt. % (wt. % stands for "percent by weight"), more preferably not more than 65 wt. %, most preferably not more than 48 wt. %, most particularly preferably not more than 37 wt. %, particularly not more than 30 wt. %, for example not more than 24 wt. %, based on the total weight of the composition (Q2). Preferably, the amount of (C) is at least 1 wt. %, more preferably at least 3 wt. %, most preferably at least 6 wt. %, most particularly preferably at least 9 wt. %, particularly at least 14 wt. %, for example at least 18 wt. %, based on the total weight of the composition (Q2).

If present, the amine(s) (C) can generally be contained in varying amounts in the composition (Q1) or (Q3). If present, the amount of (C) is preferably not more than 90 wt. % (wt. % stands for "percent by weight"), more preferably not more than 65 wt. %, most preferably not more than 48 wt. %, most particularly preferably not more than 37 wt. %, particularly not more than 30 wt. %, for example not more than 24 wt. %, based on the total weight of the composition (Q1) or (Q3). If present, the amount of (C) is preferably at least 1 wt. %, more preferably at least 3 wt. %, most preferably at least 6 wt. %, most particularly preferably at least 9 wt. %, particularly at least 14 wt. %, for example at least 18 wt. %, based on the total weight of the composition (Q1) or (Q3).

According to one embodiment, (C) is
(C1) a polymeric polyamine.

Generally, (C1) can be any polymeric polyamine, and is preferably a polyalkyleneimine or polyvinylamine, more preferably a polyalkyleneimine, most preferably a polyethyleneimine, polypropyleneimine, or polybutyleneimine, particularly a polyethyleneimine.

According to one embodiment, (C1) is preferably any polymeric polyamine comprising ethyleneimine (—CH2CH2NH—) as monomeric units, including homopolymers and any copolymers of ethyleneimine, and is preferably a homopolymer of ethyleneimine. Copolymers can be alternating, periodic, statistical or block copolymers.

Generally, (C1) can be of any polymer structure, for example a linear polymer, a ring polymer, a cross-linked polymer, a branched polymer, a star polymer, a comb polymer, a brush polymer, a dendronized polymer, or a dendrimer etc. According to one embodiment, (C1) is an essentially linear polymer, and is preferably a linear polymer.

Polyethyleneimines which may be used are polyethyleneimine homopolymers which may be present in uncrosslinked or crosslinked form. The polyethyleneimine homopolymers can be prepared by known processes, as described, for example, in Römpps (Chemie Lexikon, 8th edition, 1992, pages 3532-3533), or in Ullmanns Enzyklopädie der Technischen Chemie, 4th edition, 1974, vol. 8, pages 212-213. and the literature stated there. They have a molecular weight in the range from about 200 to 1 000 000 g/mol. Corresponding commercial products are for example available under the name Lupasol® from BASF SE.

According to one embodiment of the invention, the polyethyleneimine (C1) is preferably a polyethylenimine having a degree of branching in the range of from 0.1 to 0.95 (also referred to as "highly branched polyethyleneimine"), and more preferably a polyethylenimine having a degree of branching in the range of from 0.25 to 0.90, more preferably a polyethylenimine having a degree of branching in the range of from 0.30 to 0.80, and most preferably a polyethylenimine having a degree of branching in the range of 0.50 to 0.80.

Highly branched polyethyleneimines are characterized by its high degree of branching, which can be determined for example via $^{13}$C-NMR spectroscopy, preferably in $D_2O$, and is defined as follows:

$$\text{Degree of branching} = D + T/D + T + L$$

D (dendritic) equals the percentage of tertiary amino groups, L (linear) equals the percentage of secondary amino groups, and T (terminal) equals the percentage of primary amino groups.

Generally, the polymeric polyamine (C1) can have different weight average molecular weights. The weight average molecular weight of (C1) is preferably at least 200, more preferably at least 400, most preferably at least 550, particularly at least 650, for example at least 750. The weight average molecular weight of (C1) is preferably not more than 10,000, more preferably not more than 4,000, most preferably not more than 1,900, particularly not more than 1,500, for example not more than 1,350. The weight average molecular weight can be determined by standard gel permeation chromatography (GPC) known to the person skilled in the art.

According to another embodiment, (C) is (C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$.

A number of groups $R^{21}$ within (C2) is at least 3, preferably 3 to 5, more preferably 3 to 4, and most preferably 3.

The number of carbon atoms in each group $R^{21}$ within (C2) is 2 to 12, preferably 2 to 9, more preferably 2 to 7, most preferably 2 to 5, particularly preferably 2 to 4, particularly 2 to 3, for example 3, wherein said number of carbon atoms does not include carbon atoms in any alkoxy groups or any other substituents of $R^{21}$.

The groups $R^{21}$ within (C2) are alkoxy- or hydroxy-substituted, preferably hydroxy-substituted.

For one amine (C2), among the at least three groups $R^{21}$, at least one of the groups $R^{21}$ is different to the other groups $R^{21}$, preferably one of the groups $R^{21}$ is different to the other groups $R^{21}$.

Preferably at least one of the groups $R^{21}$, more preferably at least two of the groups $R^{21}$, most preferably at least three of the groups $R^{21}$, particularly all groups $R^{21}$ is or are covalently bound to the amino group of the amine (C2).

According to another preferred embodiment, (C2)
is an amine containing not more than one amino group and at least three hydroxy-substituted $C_2$ to $C_8$—or preferably $C_2$ to $C_5$—alkyl groups $R^{21}$, wherein at least one of the groups $R^{21}$ is different to the other groups $R^{21}$,
is preferably an amine containing not more than one amino group and at least three hydroxy-substituted $C_2$ to $C_3$ alkyl groups $R^{21}$, wherein at least one of the groups $R^{21}$ is different to the other groups $R^{21}$,
is more preferably an amine containing not more than one amino group and three hydroxy-substituted $C_2$ to $C_3$ alkyl groups $R^{21}$ which are covalently bound to the amino group, wherein one of the groups $R^{21}$ is different to the other groups $R^{21}$, and
is for example an amine selected from the group consisting of Bis(hydroxyethyl)-isopropanolamine (DEIPA), and 1,1'-((2-Hydroxyethyl)imino)dipropan-2-ol.

According to another preferred embodiment, (C2) is an amine $N(R^{21})_3$ wherein $R^{21}$ is a an alkoxy- or hydroxy-substituted—preferably a hydroxyl-substituted—$C_2$ to $C_{12}$—preferably a $C_2$ to $C_7$, more preferably a $C_2$ to $C_3$—alkyl group and wherein one of the groups $R^{21}$ is different to the other group $R^{21}$.

According to another preferred embodiment, (C2) is an amine $N(R^{21})_3$ wherein $R^{21}$ is a an alkoxy- or hydroxy-substituted—preferably a hydroxyl-substituted—$C_2$ to $C_{12}$—preferably a $C_2$ to $C_7$, more preferably a $C_2$ to $C_3$—alkyl group and wherein one of the groups $R^{21}$ is different to the other group $R^{21}$ and wherein at least one of the groups $R^{21}$ bears the alkoxy or hydroxy substituent at a secondary or tertiary carbon atom.

According to another embodiment, (C) is (C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$.

A number of groups $R^{22}$ within (C3) is at least 2, preferably 2 to 5, more preferably 2 to 4, and most preferably 2 to 3, for example 2.

The number of carbon atoms in each group $R^{22}$ within (C3) is 2 to 12, preferably 2 to 9, more preferably 2 to 7, most preferably 2 to 5, particularly preferably 2 to 4, particularly 2 to 3, for example 3, wherein said number of carbon atoms does not include carbon atoms in any alkoxy groups or any other substituents of $R^{22}$.

The groups $R^{22}$ within (C3) are alkoxy- or hydroxy-substituted, preferably hydroxy-substituted.

For one amine (C3), among the at least two groups $R^{22}$, at least one of the groups $R^{22}$ is different to the other group(s) $R^{22}$, preferably one of the groups $R^{22}$ is different to the other group(s) $R^{22}$.

Preferably at least one of the groups $R^{22}$, more preferably at least two of the groups $R^{22}$, most preferably all groups $R^{22}$ is or are covalently bound to the amino group of the amine (C3).

Preferably at least one of the groups $R^{22}$, more preferably one of the groups $R^{22}$ bears the alkoxy or hydroxy substituent at a secondary or tertiary carbon atom, particularly at a secondary carbon atom.

According to another preferred embodiment, (C3)
is an amine containing not more than one amino group and at least two hydroxy-substituted $C_2$ to $C_7$ alkyl groups $R^{22}$, wherein at least one of the groups $R^{22}$ bears the hydroxy substituent at a secondary or tertiary carbon atom and wherein at least one of the groups $R^{22}$ is different to the other group(s) $R^{22}$,
is more preferably an amine containing not more than one amino group and at least two hydroxy-substituted $C_2$ to $C_4$ alkyl groups $R^{22}$, wherein at least one of the groups $R^{22}$ bears the hydroxy substituent at a secondary carbon atom and wherein at least one of the groups $R^{22}$ is different to the other group(s) $R^{22}$,
is most preferably an amine containing not more than one amino group and two hydroxy-substituted $C_2$ to $C_3$ alkyl groups $R^{22}$ which are covalently bound to the amino group of the amine (C3), wherein at least one of the groups $R^{22}$ bears the hydroxy substituent at a secondary carbon atom and wherein one of the groups $R^{22}$ is different to the other group $R^{22}$,
is for example an amine selected from the group consisting of 1-((2-hydroxyethyl)amino)-propan-2-ol, and N-Methyl-N-hydroxyethyl-isopropanolamine.

According to another preferred embodiment, (C3) is an amine $R^{24}N(R^{22})_2$ wherein $R^{24}$ is H or a $C_1$ to $C_{12}$—preferably a $C_1$ to $C_7$, more preferably a $C_1$ to $C_3$—alkyl group and $R^{22}$ is an alkoxy- or hydroxy-substituted—preferably a hydroxyl-substituted—$C_2$ to $C_{12}$—preferably a $C_2$ to $C_7$, more preferably a $C_2$ to $C_3$—alkyl group and wherein at least one of the groups $R^{22}$ bears the hydroxy substituent at a secondary carbon atom and wherein one of the groups $R^{22}$ is different to the other group $R^{22}$.

According to another embodiment, (C) is (C4) an amine containing at least one saturated or unsaturated $C_8$ to $C_{40}$ alkyl group $R^{23}$.

The number of carbon atoms in each group $R^{23}$ within (C4) is 8 to 40, preferably 8 to 32, more preferably 8 to 24, most preferably 8 to 19, particularly preferably 8 to 16.

The group $R^{23}$ within (C4) is saturated or unsaturated, preferably unsaturated.

According to another preferred embodiment, (C4) contains at least one alkoxy or hydroxy group, more preferably at least one alkoxy and at least one hydroxy groups, most preferably at least two alkoxy and at least one hydroxyl group, particularly at least four alkoxy and at least one hydroxyl group.

For example, (C4) is an amine selected from the group consisting of: ethoxylated (2) cocoalkylamine, ethoxylated (5) cocoalkylamine, ethoxylated (15) cocoalkylamine, ethoxylated (2) oleylamine, lauryl-dimethylamine, oleyl-dimethylamine, and 2-propylheptylamine ethoxylate (5 EO), 2-propylheptylamine ethoxylate (10 EO), and 2-propylheptylamine ethoxylate (20 EO).

According to another embodiment, (C) is (C5) a saturated or unsaturated heterocyclic amine which contains at least one oxygen atom as ring atom and which does not contain a further alkoxy group.

The term "heterocyclic amine" stands for a heterocyclic compound in which at least one ring atom of the heterocyclic ring is a nitrogen atom.

The heterocyclic amine (C5) is saturated or unsaturated, preferably saturated.

The heterocyclic amine (C5) contains preferably a 5-, 6- or 7-membered heterocyclic ring, more preferably a 5- or 6-membered ring, most preferably a 6-membered ring.

The heterocyclic amine (C5) contains at least one, more preferably 1 to 3, most preferably 1 to 2, particularly one oxygen atom(s) as ring atom(s) of the heterocyclic ring.

The heterocyclic amine (C5) is preferably a morpholine or morpholine derivative, more preferably N-alkyl morpholine, most preferably N-methyl, N-ethyl, N-propyl, or N-butyl morpholine, for example N-methyl morpholine.

According to the invention, the composition (Q3) comprises—as one of its essential components—and the compositions (Q1) and (Q2) can further comprise—as one of its optional components (D) at least one amide according to the general formula (III)

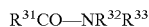

wherein $R^{31}CO$ is an acyl radical having 1 to 22 carbon atoms;

$R^{32}$ is H or alkyl, and $R^{33}$ is H or alkyl, or $R^{32}$ and $R^{33}$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.

Generally, the amide(s) (D) can be contained in varying amounts in the composition (Q3). Preferably, the amount of (D) is not more than 90 wt. % (wt. % stands for "percent by weight"), more preferably not more than 65 wt. %, most preferably not more than 45 wt. %, most particularly preferably not more than 30 wt. %, particularly not more than 22 wt. %, for example not more than 16 wt. %, based on the total weight of the composition (Q3). Preferably, the amount of (D) is at least 1 wt. %, more preferably at least 3 wt. %, most preferably at least 6 wt. %, most particularly preferably at least 9 wt. %, particularly at least 12 wt. %, for example at least 15 wt. %, based on the total weight of the composition (Q3).

If present, the amide (D) can generally be contained in varying amounts in the composition (Q1) or (Q2). If present, the amount of (D) is preferably not more than 90 wt. % (wt. % stands for "percent by weight"), more preferably not more than 65 wt. %, most preferably not more than 45 wt. %, most particularly preferably not more than 30 wt. %, particularly not more than 22 wt. %, for example not more than 16 wt. %, based on the total weight of the composition (Q1) or (Q2). If present, the amount of (D) is preferably at least 1 wt. %, more preferably at least 3 wt. %, most preferably at least 6 wt. %, most particularly preferably at least 9 wt. %, particularly at least 12 wt. %, for example at least 15 wt. %, based on the total weight of the composition (Q1) or (Q2).

In the general formula (III) of (D) $R^{32}$ is H or alkyl, preferably H or $C_1$ to $C_{40}$ alkyl, more preferably H or $C_1$ to $C_{20}$ alkyl, most preferably H or $C_1$ to $C_{10}$ alkyl, particularly preferably H or $C_1$ to $C_4$ alkyl, most particularly preferably $C_1$ to $C_4$ alkyl, particularly $C_1$ to $C_2$ alkyl, for example methyl.

In the general formula (III) of (D) $R^{33}$ is H or alkyl, preferably H or $C_1$ to $C_{40}$ alkyl, more preferably H or $C_1$ to $C_{20}$ alkyl, most preferably H or $C_1$ to $C_{10}$ alkyl, particularly preferably H or $C_1$ to $C_4$ alkyl, most particularly preferably $C_1$ to $C_4$ alkyl, particularly $C_1$ to $C_2$ alkyl, for example methyl.

According to one preferred embodiment, in the general formula (III) of (D) $R^{32}$ is H or $C_1$ to $C_4$ alkyl, and $R^{33}$ is H or $C_1$ to $C_4$ alkyl, more preferably, $R^{32}$ is $C_1$ to $C_4$ alkyl, and $R^{33}$ is $C_1$ to $C_4$ alkyl, most preferably, $R^{32}$ is $C_1$ to $C_2$ alkyl, and $R^{33}$ is $C_1$ to $C_2$ alkyl.

According to one preferred embodiment (D1PE), in the general formula (III) of (D) $R^{31}CO$ is a hydroxysubstituted acyl radical having 1 to 22 carbon atoms, and more preferably, $R^{31}CO$ is a hydroxysubstituted acyl radical having 1 to 22 carbon atoms, and $R^{32}$ is alkyl, and $R^{33}$ is alkyl, and most preferably, $R^{31}CO$ is a hydroxysubstituted acyl radical having 1 to 7 carbon atoms, and $R^{32}$ is $C_1$ to $C_4$ alkyl, and $R^{33}$ is $C_1$ to $C_4$ alkyl.

According to another preferred embodiment, the amide (D) is a N,N-dialkyl amide based on lactic acid, citric acid, tartaric acid, ricinoleic acid, 12-hydroxy stearic acid, or their mixtures, preferably a N,N-dialkyl amide based on lactic acid, citric acid, tartaric acid, or their mixtures, most preferably a N,N-dimethyl amide based on lactic acid, citric acid, tartaric acid, particularly a lactic acid N,N-dimethylamide.

According to another preferred embodiment (D2PE), in the general formula (III) of (D) $R^{31}CO$ is an acyl radical having 6 to 12 carbon atoms, more preferably, $R^{31}CO$ is an acyl radical having 8 to 10 carbon atoms.

According to another preferred embodiment, in the general formula (III) of (D) $R^{31}CO$ does not contain a hydroxy group, and more preferably, $R^{31}CO$ does not contain a hydroxy group and is an acyl radical having 6 to 12 carbon atoms, and most preferably, $R^{31}CO$ does not contain a hydroxy group and is an acyl radical having 8 to 10 carbon atoms. For example, the amide (D) is selected from the group consisting of N,N-dimethyloctanamide, N,N-dimethylnonanamide, and N,N-dimethyldecanamide.

According to another preferred embodiment (D3PE), in the general formula (III) of (D) $R^{31}CO$ is an acyl radical having 1 to 3 carbon atoms, more preferably, $R^{31}CO$ is an acyl radical having 1 to 2 carbon atoms.

According to another preferred embodiment, in the general formula (III) of (D) $R^{32}$ and $R^{33}$ together with the nitrogen atom linking them define a 5- or 6-membered saturated or unsaturated heterocyclic radical which optionally comprises 1 or 2 further heteroatoms selected from the group consisting of nitrogen, oxygen, and sulfur, and more preferably, $R^{32}$ and $R^{33}$ together with the nitrogen atom linking them define a 6-membered saturated or unsaturated heterocyclic radical which optionally comprises one further heteroatom selected from the group consisting of nitrogen, oxygen, and sulfur, most preferably $R^{32}$ and $R^{33}$ together with the nitrogen atom linking them define a 6-membered saturated heterocyclic radical which comprises one further oxygen heteroatom, particularly $R^{32}$ and $R^{33}$ together with the nitrogen atom linking them define a morpholinyl radical. For example, the amide (D) is N-acetylmorpholine or N-formylmorpholine.

According to another preferred embodiment (D4PE), in the general formula (III) of (D) $R^{32}$ and $R^{33}$ together with the nitrogen atom linking them define a 5-membered saturated or unsaturated heterocyclic radical which optionally comprises 1 or 2 further heteroatoms selected from the group consisting of nitrogen, oxygen, and sulfur, and more preferably, $R^{32}$ and $R^{33}$ together with the nitrogen atom linking them define a 5-membered saturated heterocyclic radical which optionally comprises one further nitrogen heteroatoms, most preferably $R^{32}$ and $R^{33}$ together with the nitrogen atom linking them define a 5-membered saturated heterocyclic radical which comprises one further nitrogen heteroatom which is covalently bound to the carbon atom of the carbonyl group of $R^{31}CO$, particularly $R^{32}$ and $R^{33}$ together with the nitrogen atom linking them define a imidazolidinonyl radical. For example, the amide (D) is 1,3-Dimethyl-2-imidazolidinone (also referred to as dimethylethyleneurea).

According to another preferred embodiment (D5PE), in the general formula (III) of (D) $R^{32}$ is an acyloxy substituted alkyl group, more preferably, $R^{31}CO$ is an acyl radical having 1 to 4 carbon atoms, and $R^{32}$ is an acyloxy substituted alkyl group, most preferably, $R^{31}CO$ is an acyl radical having 1 to 4 carbon atoms, $R^{32}$ is an acyloxy substituted alkyl group and $R^{33}$ is $C_1$ to $C_4$ alkyl. For example, the amide (D) is N-[2-(acetyloxy)ethyl]-N-methyl acetamide.

The composition (Q1), (Q2), or (Q3) can further optionally comprise (E) an alcohol comprising at least two hydroxy groups which are not dissociable in the aqueous medium. The alcohol (E) is different from the components (A), (B), (C) and (D).

"Not dissociable" means that the $pK_a$ value (logarithmic measure of the acid dissociation constant) for the reaction alcohol (D)→deprotonated alcohol (D)+$H^+$ of the hydroxy group in the neutral aqueous phase is more than 9.9, more preferably more than 11, most preferably more than 12, particularly preferably more than 13, for example more than 14 as measured in de-ionized water at 25° C. and atmospheric pressure. For example, propane-1,2-diol (alpha-propylene glycol) has a $pK_a$ value of 14.9 as measured in de-ionized water at 25° C. and atmospheric pressure.

If present, the alcohol (E) is preferably used as solvent in the compositions (Q1), (Q2), or (Q3).

Preferably, the alcohol (E) is a diol, triol, tetraol, pentaol, hexaol, heptaol, octaol, nonaol, decaol, or a polyol. More preferably, (E) is a diol, triol, tetraol, pentaol, or hexaol. Most preferably, (E) is a diol. Particularly most preferably, (E) is ethanediol (ethylene glycol), propanediol (propylene glycol), or butanediol (butylene glycol). Particularly, (E) is propanediol (propylene glycol). For example, (E) is propane-1,2-diol (alpha-propylene glycol).

The alcohol (E) is preferably an alcohol having 2 to 50 carbon atoms, more preferably an alcohol having 2 to 20 carbon atoms, most preferably an alcohol having 2 to 11 carbon atoms, particularly preferably an alcohol having 2 to 7 carbon atoms, in particular an alcohol having 2 to 4 carbon atoms, for example an alcohol having 3 carbon atoms.

If present, the alcohol (E) can be contained in varying amounts in the composition (Q1), (Q2), or (Q3). If present, the amount of (E) is preferably not more than 99 wt. % (wt. % stands for "percent by weight"), more preferably not more than 93 wt. %, most preferably not more than 87 wt. %, most particularly preferably not more than 80 wt. %, particularly not more than 75 wt. %, for example not more than 70 wt. %, based on the total weight of the composition (Q1), (Q2), or (Q3). If present, the amount of (E) is at least 13 wt. %, more preferably at least 20 wt. %, most preferably at least 35 wt. %, most particularly preferably at least 45 wt. %, particularly at least 55 wt. %, for example at least 60 wt. %, based on the total weight of the composition (Q1), (Q2), or (Q3).

According to another embodiment, the amount of (E) is preferably not more than 78 wt. %, more preferably not more than 67 wt. %, most preferably not more than 61 wt. %, most particularly preferably not more than 56 wt. %, particularly not more than 53 wt. %, for example not more than 50 wt. %, based on the total weight of the composition (Q1), (Q2), or (Q3). Preferably, the amount of (E) is at least 16 wt. %, more preferably at least 21 wt. %, most preferably at least 26 wt. %, most particularly preferably at least 30 wt. %, particularly at least 37 wt. %, for example at least 40 wt. %, based on the total weight of the composition (Q1), (Q2), or (Q3).

The composition (Q1), (Q2), or (Q3) can further optionally comprise (F) a nitrogen-containing fertilizer. The nitrogen-containing fertilizer (F) is different from the components (A), (B), (C) and (D).

The nitrogen-containing fertilizer (F) preferably comprises manure, ammonium sulfate, ammonium nitrate, ammonium chloride, cyanamide, dicyandiamide (DCD), calcium nitrate, or urea-containing fertilizer (F1), more preferably comprises urea-containing fertilizer (F1), most preferably comprises urea, for example is urea.

The urea-containing fertilizer (F1) is defined as a fertilizer comprising at least one component selected from the group consisting of urea, urea ammonium nitrate (UAN), isobutylidene diurea (IBDU), crotonylidene diurea (CDU) and urea formaldehyde (UF), urea-acetaldehyde, and urea-glyoxal condensates.

In customary commercial fertilizer quality, the urea has a purity of at least 90%, and may for example be in crystalline, granulated, compacted, prilled or ground form.

If present, the fertilizer (F) can be contained in varying amounts in the composition (Q1), (Q2), or (Q3). If present, the amount of (F) is preferably not more than 99.99 wt. % (wt. % stands for "percent by weight"), more preferably not more than 99.9 wt. %, most preferably not more than 99.5 wt. %, most particularly preferably not more than 99 wt. %, particularly not more than 98 wt. %, for example not more than 97 wt. %, based on the total weight of the composition (Q1), (Q2), or (Q3). If present, the amount of (F) is preferably at least 96 wt. %, more preferably at least 93 wt. %, most preferably at least 90 wt. %, most particularly preferably at least 82 wt. %, particularly at least 70 wt. %, for example at least 50 wt. %, based on the total weight of the composition (Q1), (Q2), or (Q3).

The properties of the composition (Q1), (Q2), or (Q3)—such as stability, storage life, or stability when applied to or coated on nitrogen-containing fertilizers (F) such as urea—may depend on the pH of the corresponding composition. In general, the composition (Q1), (Q2), or (Q3) can have any pH value. The pH value of the composition (Q1), (Q2), or (Q3) is preferably not more than 14, more preferably not more than 13, most preferably not more than 12, particularly preferably not more than 11.6, particularly most preferably not more than 11.3, particularly not more than 11, for example not more than 10.7. The pH value of the composition (Q1), (Q2), or (Q3) is preferably at least 6, more preferably at least 7, most preferably at least 7.5, particularly preferably at least 8.0, particularly most preferably at least 8.2, particularly at least 8.5, for example at least 8.7. The pH value of the composition (Q1), (Q2), or (Q3) is preferably in the range of from 6 to 14, more preferably from 7 to 13, most preferably from 7.5 to 12, particularly preferably from 8 to 11.6, particularly most preferably from 8.2 to 11.3, particularly from 8.5 to 11, for example from 8.7 to 10.7.

The composition (Q1), (Q2), or (Q3) can further optionally contain at least one pH adjusting agent (G). The pH adjusting agent (G) is different from the components (A), (B), (C) and (D). In general, the pH adjusting agent (G) is a compound which is added to the composition (Q1), (Q2), or (Q3) to have its pH value adjusted to the required value. Preferably, the composition (Q1), (Q2), or (Q3) contains at least one pH adjusting agent (G). Preferred pH adjusting agents are inorganic acids, carboxylic acids, amine bases, alkali hydroxides, ammonium hydroxides, including tetraalkylammonium hydroxides. Particularly, the pH adjusting agent (G) is nitric acid, sulfuric acid, ammonia, sodium hydroxide, or potassium hydroxide. For example, the pH adjusting agent (G) is potassium hydroxide.

If present, the pH adjusting agent (G) can be contained in varying amounts in the composition (Q1), (Q2), or (Q3). If present, the amount of (G) is preferably not more than 10 wt. %, more preferably not more than 2 wt. %, most preferably not more than 0.5 wt. %, particularly not more than 0.1 wt. %, for example not more than 0.05 wt. %, based on the total weight of the corresponding composition (Q1), (Q2), or (Q3). If present, the amount of (G) is preferably at least 0.0005 wt. %, more preferably at least 0.005 wt. %, most preferably at least 0.025 wt. %, particularly at least 0.1 wt. %, for example at least 0.4 wt. %, based on the total weight of the corresponding composition (Q1), (Q2), or (Q3).

The composition (Q1), (Q2), or (Q3) can further optionally contain the compound (K) selected from the group consisting of (K1) an amine selected from the group consisting of methyldiethanolamine, tetrahydroxypropylethylenediamine, trimethylaminoethylethanolamine, N,N,N',N'-tetramethyl-1,6-hexanediamine, N,N',N''-tris(dimethylaminopropyl)hexahydrotriazine, and 2,2'-dimorpholinyldiethyl ether, (K2) an amine containing not more than one amino group and at least three alkoxy- or hydroxy-substituted $C_2$ to $C_{12}$ alkyl groups $R^{41}$, wherein all groups $R^{41}$ within said amine are identical, and (K3) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical.

(K2) or (K3) are preferably triethanolamine, tripropanolamine, diisopropanolamine, triisopropanolamine, diethanolamine, methyldiethanolamine, or methyldipropanolamine.

If present, the compound (K) can generally be contained in varying amounts in the composition (Q1), (Q2), or (Q3). If present, the amount of (K) is preferably not more than 40 wt. % (wt. % stands for "percent by weight"), more preferably not more than 30 wt. %, most preferably not more than 25 wt. %, most particularly preferably not more than 20 wt. %, particularly not more than 18 wt. %, for example not more than 15 wt. %, based on the total weight of the composition (Q1), (Q2), or (Q3).). If present, the amount of (K) is preferably at least 1 wt. %, more preferably at least 3 wt. %, most preferably at least 5 wt. %, most particularly preferably at least 8 wt. %, particularly at least 11 wt. %, for example at least 14 wt. %, based on the total weight of the composition (Q1), (Q2), or (Q3).

The composition (Q1), (Q2), or (Q3) can further optionally contain components (H) which are selected from the group consisting of auxiliaries, solvents, solid carriers, surfactants, adjuvants, thickeners, bactericides, anti-freezing agents, anti-foaming agents, colorants, tackifiers, binders, preservatives, antioxidants, and odorants. The component (H) is different from the components (A), (B), (C) and (D).

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, lime-stone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-subsituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compound I on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are
  inorganic colorants, such as iron oxide, titan oxide, iron hexacyanoferrate,
  metal-complex dyes such as chromium-complex dyes, for example Orasol Yellow 141,
  organic colorants such as alizarin-, azo- and phthalocyanine colorants.

Preferred colorants are metal-complex dyes, more preferably chromium-complex dyes, for example Orasol Yellow 141.

Suitable tackifiers or binders are polyvinylpyrrolidones, polyvinylacetates, polyvinyl alcohols, polyacrylates, biological or synthetic waxes, and cellulose ethers.

Suitable preservatives include e.g. sodium benzoate, benzoic acid, sorbic acid, and derivatives thereof.

Suitable antioxidants include sulfites, ascorbic acid, tocopherol, tocopherol acetate, tocotrienol, melatonin, carotene, beta-carotene, ubiquinol, and derivatives thereof. Tocophercol acetate is preferred as antioxidant.

Suitable odorants include perfume materials which are for example mentioned in U.S. Pat. No. 7,182,537, including allo-ocimene, Allyl cyclohexanepropionate, Allyl heptanoate, trans-Anethole, Benzyl butyrate, Camphene, Cadinene, Carvacrol, cis-3-Hexenyl tiglate, Citronellol, Citronellyl acetate, Citronellyl nitrile, Citronellyl propionate, Cyclohexylethyl acetate, Decyl Aldehyde (Capraldehyde), Dihydromyrcenol, Dihydromyrcenyl acetate, 3,7-Dimethyl-1-octanol, Diphenyloxide, Fenchyl Acetate (1,3,3-Trinnethyl-2-norbornanyl acetate), Geranyl acetate, Geranyl formate, Geranyl nitrile, cis-3-Hexenyl isobutyrate, Hexyl Neopentanoate, Hexyl tiglate, alpha-Ionone, Ethyl Vanillin L80, Isoeugenol, Methyl cinnamate, Methyl dihydrojasmonate, Methyl beta-naphthyl ketone, Phenoxy ethyl isobutyrate, Vanillin L28, Isobornyl acetate, Isobutyl benzoate, Isononyl acetate, Isononyl alcohol (3,5,5-Trinnethyl-1-hexanol), Isopulegyl acetate, Lauraldehyde, d-Limonene, Linalyl acetate, (−)-L-Menthyl acetate, Methyl Chavicol (Estragole), Methyl n-nonyl acetaldehyde, methyl octyl acetaldehyde, beta-Myrcene, Neryl acetate, Nonyl acetate, Nonaldehyde, p-Cymene, alpha-Pinene, beta-Pinene, alpha-Terpinene, gamma-Terpinene, alpha-Terpinyl acetate, Tetrahydrolinalool, Tetrahydromyrcenol, 2-Undecenal, Verdox (o-t-Butylcyclohexyl acetate), Vertenex (4-tert,Butylcyclohexyl acetate). Citronellyl nitrile is preferred as odorant.

According to one embodiment, individual components of the compositions (Q1), (Q2), or (Q3) such as parts of a kit or parts of a binary or ternary mixture may be mixed by the user himself in a spray tank and further auxiliaries may be added, if appropriate.

If present, the component (H) can be contained in varying amounts in the composition (Q1), (Q2), or (Q3). If present, the amount of (H) is preferably not more than 10 wt. %, more preferably not more than 4 wt. %, most preferably not more than 2 wt. %, particularly not more than 1 wt. %, for example not more than 0.5 wt. %, based on the total weight of the corresponding composition (Q1), (Q2), or (Q3). If present, the amount of (H) is preferably at least 0.0005 wt. %, more preferably at least 0.005 wt. %, most preferably at least 0.025 wt. %, particularly at least 0.1 wt. %, for example at least 0.4 wt. %, based on the total weight of the corresponding composition (Q1), (Q2), or (Q3).

With respect to the composition (Q1), (Q2), or (Q3), the weight ratio of the mixture (A) to the aromatic alcohol (B)—in case of (Q2) or (Q3) only as far as (B) is present—is preferably between 50:1 and 1:50, more preferably between 10:1 and 1:10, most preferably between 5:1 and 1:5, particularly preferably between 3:1 and 1:3, particularly most preferably between 2:1 and 1:2, particularly between 1:1 and 1:2, for example between 1:1.5 to 1:1.8.

With respect to the composition (Q1), (Q2), or (Q3), the weight ratio of the mixture (A) to the amine (C)—in case of (Q1) or (Q3) only as far as (C) is present—is preferably between 100:1 and 1:20, more preferably between 40:1 and 1:8, most preferably between 30:1 and 1:6, particularly preferably between 20:1 and 1:5, particularly most preferably between 10:1 and 1:2, particularly between 5:1 and 1:1.2, for example between 2:1 to 1:1.

With respect to the composition (Q1), (Q2), or (Q3), the weight ratio of the mixture (A) to the amide (D)—in case of (Q1) or (Q2) only as far as (D) is present—is preferably between 50:1 and 1:50, more preferably between 10:1 and 1:10, most preferably between 5:1 and 1:5, particularly preferably between 3:1 and 1:3, particularly most preferably between 2.5:1 and 1:2, particularly between 2:1 and 1:1, for example between 1.8:1 to 1.2:1.

According to the invention, a process for treating the soil comprising applying the compositions (Q1), (Q2), or (Q3) into the soil in-furrow and/or as side-dress and/or as broadcast was found.

Preferably, said process comprises: applying the compositions (Q1), (Q2), or (Q3) by spraying it onto the soil. More preferably, said process are conducted in a way wherein the compositions (Q1), (Q2), or (Q3) are—either at the same time (i.e. simultaneously) or with a time difference (i.e.

separately)—applied together with at least one nitrogen-containing fertilizer (F) into the soil in-furrow and/or as side-dress and/or as broadcast.

According to the invention, the compositions (Q1), (Q2), or (Q3) can be used as additive or as coating material for nitrogen-containing fertilizers (F), particularly for urea-containing fertilizer (F1), for example for urea. According to one preferred embodiment, the compositions (Q1), (Q2), or (Q3) are used as coating material for nitrogen-containing fertilizers (F), particularly for urea-containing fertilizer (F1), for example for urea. The nitrogen-containing fertilizer (F) cam be in crystalline, granulated, compacted, prilled or ground form, and is preferably in granulated from.

The compositions (Q1), (Q2), or (Q3) can be applied to or on nitrogen-containing fertilizers (F) by either mixing the (Q1), (Q2), or (Q3), in either liquid or solid form, with the nitrogen-containing fertilizer (F), or incorporating them into (F) by granulation, compacting or prilling, by addition to a corresponding fertilizer mixture or to a mash or melt. Preferably, the compositions (Q1), (Q2), or (Q3) are applied to the surface of existing granules, compacts or prills of the nitrogen-containing fertilizer (F)—particularly of the urea-containing fertilizer (F1)—by means of spraying, powder application or impregnating, for example. This can also be done using further auxiliaries such as adhesive promoters or encasing materials. Examples of apparatuses suitable for performing such application include plates, drums, mixers or fluidized-bed apparatus, although application may also take place on conveyor belts or their discharge points or by means of pneumatic conveyors for solids. A concluding treatment with anticaking agents and/or antidust agents is like-wise possible. The compositions (Q1), (Q2), or (Q3) are used in the context of fertilization with nitrogen-containing fertilizer (F), particularly with urea-containing fertilizer (F1). Application takes place preferably to an agriculturally or horticulturally exploited plot.

In parallel with the improvement of the utilization of nitrogen in the urea-containing, mineral and organic fertilizers, the use of the compositions (Q1), (Q2), or (Q3) has the effect that there is an Increase—in some cases considerably—in the yields or production of biomass of crop plants.

The compositions (Q1), (Q2), or (Q3) may be added to organic fertilizers, such as liquid manure, for example, during the actual storage of such fertilizers, in order thus to prevent nitrogen nutrient losses, by virtue of decelerated conversion of the individual forms of nitrogen into gaseous nitrogen compounds, which are therefore volatile, and in order as a result, at the same time, to contribute to a lowering of the ammonia load in animal stables.

In this context it is immaterial whether the compositions (Q1), (Q2), (Q3) are incorporated, by melting, for example, into the nitrogen-containing fertilizer (F), or else are applied to the fertilizer surface or applied separately from the spreading of the fertilizer, in the form, for example, of a (suspension) concentrate, a solution or a formulation.

For the below examples and the below tables, the following abbreviations have been used:
%=percent by weight (wt. %)
ad100=the percent by weight of this component is 100% minus the sum of the weight percentages (in percent by weight) of all other components comprised in the composition
BDA=Butyldiethanolamine
BZ=benzyl alcohol
(C)i=amine component (C)
(C)ii=additional amine component (C)
Coat.=coated on urea (all the data in the rows below the "coated row" are experimental data after the composition has been coated on urea)
colo.=colorant Orasol Yellow 141
conc.=concentration (e.g. amount) of NxPT in percent by weight based on the total weight of the urea fertilizer on which the composition was coated
Comp.=comparative example
DEI=Bis(hydroxyethyl)-isopropanolamine (DEIPA)
dev.=deviation, as an indicator for the stability after coated on urea, calculated as difference between the NxPT content in the heat stability test and the content in the cold stability test—both after coated on urea—, indicated as percent
DMI=1,3-Dimethyl-2-imidazolidinone (Dimethylethylenurea)
DML=Dimethyllactamide
E15=ethoxylated (5) cocoalkylamine
E25=ethoxylated (15) cocoalkylamine
Ex#=Example no.
F.ex.=formulation example
HBI=1-((2-hydroxyethyl)amino)propan-2-ol (Hydroxyethyl-bis-isopropanolamin)
Inv.=Example of the invention
LES=2-propylheptylamine ethoxylate (10 EO)
LFG=polyethyleneimine with a weight average molecular weight of 800 g/mol as measured by GPC (dry substance, at pH 4.5)
LGA=polyethyleneimine with a weight average molecular weight of 1300 g/mol as measured by GPC (dry substance, at pH 4.5)
LL=technical mixture (with a 85.20% concentration of NxPT) containing 23.8% NPPT and 76.2% NBPT
LPN=N,N',N"-tris(dimethylaminopropyl)hexahydrotriazine
LT=technical mixture (with a 84.27% concentration of NxPT based on the total amount of the technical mixture) containing 23.7% NPPT and 76.3% NBPT, based on the total amount of NxPT within the technical mixture
HCM=Mixture of N,N-Dimethyloctanamide (50-65%) and N,N-Dimethyldecanamide (37-50%)
MDA=Methyldiethanolamine
MPA=n-Acetyl-morpholine
MPF=n-Formyl-morpholine
NB/c=Content (percent by weight) of NBPT in cold stability test (2 weeks at 5° C.)
NP/c=Content (percent by weight) of NPPT in cold stability test (2 weeks at 5° C.)
Nx/c=Content (Percent by weight) of NxPT in cold stability test (2 weeks at 5° C.)
NB/h=Content (Percent by weight) of NBPT in heat stability test (2 weeks at 54° C.)
NP/h=Content (Percent by weight) of NPPT in heat stability test (2 weeks at 54° C.)
Nx/h=Content (Percent by weight) of NxPT in heat stability test (2 weeks at 54° C.)
NB/a=Content (Percent by weight) of NBPT in cold stability test (2 weeks at 5° C.) after coated on urea
NP/a=Content (Percent by weight) of NPPT in cold stability test (2 weeks at 5° C.) after coated on urea
Nx/a=Content (Percent by weight) of NxPT in cold stability test (2 weeks at 5° C.) after coated on urea
NB/b=Percent by weight of NBPT in heat stability test (4 weeks at 40° C. and 50% air humidity) after coated on urea
NP/b=Percent by weight of NPPT in heat stability test (4 weeks at 40° C. and 50% air humidity) after coated on urea Nx/b=Percent by weight of NxPT in heat stability test (4 weeks at 40° C. and 50% air humidity) after coated on urea
NxPT=Mixture (A) comprising NBPT and NPPT (the content of NxPT is the sum of the content of NBPT and NPPT)
NyPT=Mixture (A) comprising NBPT and/or NPPT
NMM=N-methyl-morpholine
NMP=N-methyl-pyrrolidinone
PEI=polyethyleneimine
PG=propylene glycol
pH=pH value measured at 2% concentration
SEA=is N-[2-(acetyloxy)ethyl]-N-methyl acetamide
stabi.=storage stability of NxPT, calculated as difference between the NxPT content in the heat stability test and the content in the cold stability test, indicated as percent
TEA=triethanolamine
TPA=tocopherol acetate
visc.=viscosity in mPas The following compositions as listed in Table 1 are preferred embodiments of the present invention.

For the preferred embodiments PE1 to PE161, the following abbreviations are used in addition to the abbreviations listed above:

(C1) is a polymeric polyamine;
(C2) is an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$;
(C3) is an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$;
(C4) is an amine containing at least one saturated or unsaturated $C_8$ to $C_{40}$ alkyl group $R^{23}$, and
(C5) is a saturated or unsaturated heterocyclic amine which contains at least one oxygen atom as ring atom and which does not contain a further alkoxy group.

(D1) is an amide according to the general formula (III)

$$R^{31}CO-NR^{32}R^{33}$$

wherein
$R^{31}CO$ is a hydroxysubstituted acyl radical having 1 to 22 carbon atoms;
$R^{32}$ is H or $C_1$ to $C_4$ alkyl, and
$R^{33}$ is H or $C_1$ to $C_4$ alkyl.

(D2) is an amide according to the general formula (III)

$$R^{31}CO-NR^{32}R^{33}$$

wherein
$R^{31}CO$ is a is an acyl radical having 1 to 22 carbon atoms which do not contain a hydroxyl group;
$R^{32}$ is H or $C_1$ to $C_4$ alkyl, and
$R^{33}$ is H or $C_1$ to $C_4$ alkyl.

(D3) is an amide according to the general formula (III)

$$R^{31}CO-NR^{32}R^{33}$$

wherein
$R^{31}CO$ is an acyl radical having 1 to 22 carbon atoms;
$R^{32}$ and $R^{33}$ together with the nitrogen atom linking them define a 6-membered saturated heterocyclic radical which comprises one further oxygen heteroatom.

(D4) is an amide according to the general formula (III)

$$R^{31}CO-NR^{32}R^{33}$$

wherein
$R^{31}CO$ is an acyl radical having 1 to 22 carbon atoms;
$R^{32}$ and $R^{33}$ together with the nitrogen atom linking them define a 5-membered saturated heterocyclic radical which comprises one further nitrogen heteroatom.

(D5) is an amide according to the general formula (III)

$$R^{31}CO-NR^{32}R^{33}$$

wherein
$R^{31}CO$ is an acyl radical having 1 to 22 carbon atoms;
$R^{32}$ is an acyloxy substituted alkyl group, and
$R^{33}$ is H or alkyl.

TABLE 1

| PE# | (A) | (B) | (C)i | (C)ii | (D) | (E) | (K) | (H) |
|---|---|---|---|---|---|---|---|---|
| 1 | NyPT | ≥10% BZ | | | | | | |
| 2 | NyPT | | | | DMI | | | |
| 3 | NyPT | | | | (D4) | | | |
| 4 | NyPT | | | | HCM | | | |
| 5 | NyPT | | | | (D2) | | | |
| 6 | NyPT | | | | SEA | | | |
| 7 | NyPT | | | | (D5) | | | |
| 8 | NyPT | | | | DML | | | |
| 9 | NyPT | | | | (D1) | | | |
| 10 | NyPT | | | | MPA | | | |
| 11 | NyPT | | | | MPF | | | |
| 12 | NyPT | | | | (D3) | | | |
| 13 | NyPT | | LES | | | | | |
| 14 | NyPT | | (C4) | | | | | |
| 15 | NyPT | | PEI | | | | | |
| 16 | NyPT | | (C1) | | | | | |
| 17 | NyPT | | NMM | | | | | |
| 18 | NyPT | | (C5) | | | | | |
| 19 | NyPT | | LES | | SEA | | | |
| 20 | NyPT | | (C4) | | (D5) | | | |
| 21 | NyPT | | PEI | | SEA | | | |
| 22 | NyPT | | (C1) | | (D5) | | | |
| 23 | NyPT | | | | SEA | | TEA | |
| 24 | NyPT | | | | (D5) | | (K2) | |
| 25 | NyPT | | NMM | | SEA | | | |
| 26 | NyPT | | (C5) | | (D5) | | | |
| 27 | NyPT | | LES | | DML | | | |
| 28 | NyPT | | (C4) | | (D1) | | | |
| 29 | NyPT | | PEI | | DML | | | |
| 30 | NyPT | | (C1) | | (D1) | | | |
| 31 | NyPT | | | | DML | | TEA | |
| 32 | NyPT | | | | (D1) | | (K2) | |
| 33 | NyPT | | LES | PEI | DML | | | |
| 34 | NyPT | | (C4) | (C1) | (D1) | | | |
| 35 | NyPT | | LES | NMM | DML | | | |
| 36 | NyPT | | (C4) | (C5) | (D1) | | | |
| 37 | NyPT | | LES | | HCM | | | |
| 38 | NyPT | | (C4) | | (D2) | | | |
| 39 | NyPT | | PEI | | HCM | | | |
| 40 | NyPT | | (C1) | | (D2) | | | |
| 41 | NyPT | | | | HCM | | TEA | |
| 42 | NyPT | | | | (D2) | | (K2) | |
| 43 | NyPT | | NMM | | HCM | | | |
| 44 | NyPT | | (C5) | | (D2) | | | |
| 45 | NyPT | | NMM | | DML | | | |
| 46 | NyPT | | (C5) | | (D1) | | | |
| 47 | NyPT | | LES | | DML | | TEA | |
| 48 | NyPT | | (C4) | | (D1) | | (K2) | |
| 49 | NyPT | | LES | | DML | | BDA | |
| 50 | NyPT | | (C4) | | (D1) | | (K3) | |
| 51 | NyPT | | LES | | DML | | MDA | |
| 52 | NyPT | | (C4) | | (D1) | | (K3) | |
| 53 | NyPT | | PEI | LES | | | | |
| 54 | NyPT | | (C1) | (C4) | | | | |
| 55 | NyPT | | LES | PEI | HCM | | | |
| 56 | NyPT | | (C4) | (C1) | (D2) | | | |
| 57 | NyPT | ≥10% BZ | | | | | PG | |
| 58 | NyPT | | | | DMI | | PG | |
| 59 | NyPT | | | | (D4) | | PG | |
| 60 | NyPT | | | | HCM | | PG | |
| 61 | NyPT | | | | (D2) | | PG | |
| 62 | NyPT | | | | SEA | | PG | |

TABLE 1-continued

| PE# | (A) | (B) | (C)i | (C)ii | (D) | (E) | (K) | (H) |
|---|---|---|---|---|---|---|---|---|
| 63 | NyPT | | | | (D5) | PG | | |
| 64 | NyPT | | | | DML | PG | | |
| 65 | NyPT | | | | (D1) | PG | | |
| 66 | NyPT | | | | MPA | PG | | |
| 67 | NyPT | | | | MPF | PG | | |
| 68 | NyPT | | | | (D3) | PG | | |
| 69 | NyPT | | LES | | | PG | | |
| 70 | NyPT | | (C4) | | | PG | | |
| 71 | NyPT | | PEI | | | PG | | |
| 72 | NyPT | | (C1) | | | PG | | |
| 73 | NyPT | | NMM | | | PG | | |
| 74 | NyPT | | (C5) | | | PG | | |
| 75 | NyPT | | LES | | SEA | PG | | |
| 76 | NyPT | | (C4) | | (D5) | PG | | |
| 77 | NyPT | | PEI | | SEA | PG | | |
| 78 | NyPT | | (C1) | | (D5) | PG | | |
| 79 | NyPT | | | | SEA | PG | TEA | |
| 80 | NyPT | | | | (D5) | PG | (K2) | |
| 81 | NyPT | | NMM | | SEA | PG | | |
| 82 | NyPT | | (C5) | | (D5) | PG | | |
| 83 | NyPT | | LES | | DML | PG | | |
| 84 | NyPT | | (C4) | | (D1) | PG | | |
| 85 | NyPT | | PEI | | DML | PG | | |
| 86 | NyPT | | (C1) | | (D1) | PG | | |
| 87 | NyPT | | | | DML | PG | TEA | |
| 88 | NyPT | | | | (D1) | PG | (K2) | |
| 89 | NyPT | | LES | PEI | DML | PG | | |
| 90 | NyPT | | (C4) | (C1) | (D1) | PG | | |
| 91 | NyPT | | LES | NMM | DML | PG | | |
| 92 | NyPT | | (C4) | (C5) | (D1) | PG | | |
| 93 | NyPT | | LES | | HCM | PG | | |
| 94 | NyPT | | (C4) | | (D2) | PG | | |
| 95 | NyPT | | PEI | | HCM | PG | | |
| 96 | NyPT | | (C1) | | (D2) | PG | | |
| 97 | NyPT | | | | HCM | PG | TEA | |
| 98 | NyPT | | | | (D2) | PG | (K2) | |
| 99 | NyPT | | NMM | | HCM | PG | | |
| 100 | NyPT | | (C5) | | (D2) | PG | | |
| 101 | NyPT | | NMM | | DML | PG | | |
| 102 | NyPT | | (C5) | | (D1) | PG | | |
| 103 | NyPT | | LES | | DML | PG | TEA | |
| 104 | NyPT | | (C4) | | (D1) | PG | (K2) | |
| 105 | NyPT | | LES | | DML | PG | BDA | |
| 106 | NyPT | | (C4) | | (D1) | PG | (K3) | |
| 107 | NyPT | | LES | | DML | PG | MDA | |
| 108 | NyPT | | (C4) | | (D1) | PG | (K3) | |
| 109 | NyPT | | PEI | LES | | PG | | |
| 110 | NyPT | | (C1) | (C4) | | PG | | |
| 111 | NyPT | | LES | PEI | HCM | PG | | |
| 112 | NyPT | | (C4) | (C1) | (D2) | PG | | |
| 113 | NyPT | ≥10% BZ | | | | | LPN | |
| 114 | NyPT | ≥10% BZ | | | | | (K1) | |
| 115 | NyPT | ≥10% BZ | | | DMI | | | |
| 116 | NyPT | ≥10% BZ | | | (D4) | | | |
| 117 | NyPT | ≥10% BZ | | | HCM | | | |
| 118 | NyPT | ≥10% BZ | | | (D2) | | | |
| 119 | NyPT | ≥10% BZ | | | SEA | | | |
| 120 | NyPT | ≥10% BZ | | | (D5) | | | |
| 121 | NyPT | ≥10% BZ | | | DML | | | |
| 122 | NyPT | ≥10% BZ | | | (D1) | | | |
| 123 | NyPT | ≥10% BZ | | | MPA | | | |
| 124 | NyPT | ≥10% BZ | | | MPF | | | |
| 125 | NyPT | ≥10% BZ | | | (D3) | | | |
| 126 | | | | | | | | |
| 127 | NyPT | ≥10% BZ | LES | | | | | |
| 128 | NyPT | ≥10% BZ | (C4) | | | | | |
| 129 | NyPT | ≥10% BZ | PEI | | | | | |
| 130 | NyPT | ≥10% BZ | (C1) | | | | | |
| 131 | NyPT | ≥10% BZ | NMM | | | | | |
| 132 | NyPT | ≥10% BZ | (C5) | | | | | |
| 133 | NyPT | ≥10% BZ | LES | | SEA | | | |
| 134 | NyPT | ≥10% BZ | (C4) | | (D5) | | | |
| 135 | NyPT | ≥10% BZ | PEI | | SEA | | | |
| 136 | NyPT | ≥10% BZ | (C1) | | (D5) | | | |
| 137 | NyPT | ≥10% BZ | | | SEA | | TEA | |
| 138 | NyPT | ≥10% BZ | | | (D5) | | (K2) | |
| 139 | NyPT | ≥10% BZ | NMM | | SEA | | | |
| 140 | NyPT | ≥10% BZ | (C5) | | (D5) | | | |
| 141 | NyPT | ≥10% BZ | LES | | DML | | | |
| 142 | NyPT | ≥10% BZ | (C4) | | (D1) | | | |
| 143 | NyPT | ≥10% BZ | PEI | | DML | | | |
| 144 | NyPT | ≥10% BZ | (C1) | | (D1) | | | |
| 145 | NyPT | ≥10% BZ | | | DML | | TEA | |
| 146 | NyPT | ≥10% BZ | | | (D1) | | (K2) | |
| 147 | NyPT | ≥10% BZ | LES | PEI | DML | | | |
| 148 | NyPT | ≥10% BZ | (C4) | (C1) | (D1) | | | |
| 149 | NyPT | ≥10% BZ | LES | NMM | DML | | | |
| 150 | NyPT | ≥10% BZ | (C4) | (C5) | (D1) | | | |
| 151 | NyPT | ≥10% BZ | LES | | HCM | | | |
| 152 | NyPT | ≥10% BZ | (C4) | | (D2) | | | |
| 153 | NyPT | ≥10% BZ | PEI | | HCM | | | |
| 154 | NyPT | ≥10% BZ | (C1) | | (D2) | | | |
| 155 | NyPT | ≥10% BZ | | | HCM | | TEA | |
| 156 | NyPT | ≥10% BZ | | | (D2) | | (K2) | |
| 157 | NyPT | ≥10% BZ | NMM | | HCM | | | |
| 158 | NyPT | ≥10% BZ | (C5) | | (D2) | | | |
| 159 | NyPT | ≥10% BZ | NMM | | DML | | | |
| 160 | NyPT | ≥10% BZ | (C5) | | (D1) | | | |
| 161 | NyPT | ≥10% BZ | LES | | DML | | TEA | |
| 162 | NyPT | ≥10% BZ | (C4) | | (D1) | | (K2) | |
| 163 | NyPT | ≥10% BZ | LES | | DML | | BDA | |
| 164 | NyPT | ≥10% BZ | (C4) | | (D1) | | (K3) | |
| 165 | NyPT | ≥10% BZ | LES | | DML | | MDA | |
| 166 | NyPT | ≥10% BZ | (C4) | | (D1) | | (K3) | |
| 167 | NyPT | ≥10% BZ | PEI | LES | | | | |
| 168 | NyPT | ≥10% BZ | (C1) | (C4) | | | | |
| 169 | NyPT | ≥10% BZ | LES | PEI | HCM | | | |
| 147 | NyPT | ≥10% BZ | (C4) | (C1) | (D2) | | | |
| 148 | NyPT | ≥10% BZ | DEI | | | | | |
| 149 | NyPT | ≥10% BZ | HBI | | | | | |
| 150 | NyPT | ≥10% BZ | (C2) | | | | | |
| 151 | NyPT | ≥10% BZ | E15 | | | | | |
| 152 | NyPT | ≥10% BZ | E25 | | | | | |
| 153 | NyPT | ≥10% BZ | (C4) | | | | | |
| 154 | NyPT | ≥10% BZ | (C3) | | | | | |
| 155 | NyPT | | DEI | | | PG | | |
| 156 | NyPT | | HBI | | | PG | | |
| 157 | NyPT | | (C2) | | | PG | | |
| 158 | NyPT | | E15 | | | PG | | |
| 159 | NyPT | | E25 | | | PG | | |
| 160 | NyPT | | (C4) | | | PG | | |
| 161 | NyPT | | (C3) | | | PG | | |

The advantages of the invention are that the enhancement of the stability of the (thio)phosphoric acid triamide(s)—particularly when applied to or coated on nitrogen-containing fertilizers such as urea—and a relatively long storage life—particularly before being applied to or coated on nitrogen-containing fertilizers—was achieved with the compositions (Q1), (Q2), (Q3). Moreover, the compositions (Q1), (Q2), (Q3) do not adversely affect the urease-inhibiting effect and/or activity of the (thio)phosphoric acid triamide. Last, but not least, the compositions (Q1), (Q2), (Q3) can be easily and safely packaged, transported and shipped, even in large quantities, and can be easily and safely handled and applied for soil treatment, even in large quantities The examples which follow illustrate the invention without restricting it.

Preparation of the Formulations
Preparation of the Formulation

According to the ratios and components as specified in Table 2, all components were mixed, and the resulting mixture was stirred until complete dissolution of the solid and analyzed for the content of NBPT, NPPT, NxPT (by HPLC), viscosity, dissolution (2%) in water and pH.

For example, in case of Ex. #310092, the technical mixture LT (25% pure NxPT) was mixed with 50.08% benzyl alcohol and 10% LFG, 10% DML and 0.25% colo. The mixture was stirred until complete dissolution of the solid and analyzed for NxPT content (by HPLC), viscosity, dissolution (2%) in water and pH.

Formulation Storage Stability

The mixture of each example (e.g. Ex.#310092) was stored in closed bottles for 14 days at 54° C. (referred to as heat stability test in the following) and then analyzed for the content of NxPT. The mixture of each example (e.g. Ex.#310092) was also stored in closed bottles for 14 days at 5° C. (referred to as cold stability test in the following) and then analyzed for the content of NxPT. The storage stability in % was calculated as difference between the content in the heat stability test and the content in the cold stability test.

Coating of Urea

EXAMPLE 1.1

500 g granulated urea was charged to a rotating drum (Type Hege 11) and 2 g of the formulation of each example (e.g. Ex.#310092) was sprayed on the urea using a rotating disc. The homogeneous coated urea was discharged after 1 min and analyzed for the content of NBPT, NPPT, NxPT (by HPLC).

Stability on Urea

The coated urea sample of 300 g was stored in a petri dish for 4 weeks at 50% humidity in a climate chamber. For analysis the sample was homogenized and analyzed for the content of NBPT, NPPT, NxPT (by HPLC)

The content of NxPT measured by HPLC measurement is always the sum of the both components NBPT and NBPT.

Viscosity was measured at the undiluted formulation with a cone-plate rheometer AR 2000ex (TA Instruments) at shear rate of 100 s$^{-1}$ and 20° C.

The pH value was measured at 2% concentration in CIPAC water D.

All examples of the inventions are liquid, clear compositions which are either colourless or yellow.

TABLE 2

Examples of the compositions of the invention and of comparative compositions, and data on their viscosity, pH value, storage stability and stability after coated on urea Table 2

| | Ex# | | | | | | | |
|---|---|---|---|---|---|---|---|---|
| | 310007 Inv. | 310008 Inv. | 310010 Inv. | 310011 Inv. | 310012 Inv. | 310013 Inv. | 310014 Inv. | 310015 Inv. |
| (A) PG | 29.67% LT ad100 | 29.67% LT ad100 | 29.67% LT ad100 | 29.67% LT ad100 | 29.67% LT ad100 | 29.67% LT ad100 | 29.67% LT ad100 | 29.67% LT ad100 |
| BZ | 20% | | | | | | | |
| (C)i | | | | | | | | 20% LES |
| (C)ii | | | | | | | | |
| (D) | | 20% DMI | 20% HCM | 20% SEA | 20% DML | 20% MPA | 20% MPF | |
| other colo. | | | | | | | | |
| visc. | 39 | 37 | 47 | 50 | 49 | 51 | 44 | 100 |
| pH | 8.2 | 8.1 | 8.4 | 7.5 | 8.1 | 8.2 | 8.2 | 9.6 |
| NB/c | 18.95% | 19.20% | 19.08% | 18.81% | 18.89% | 19.05% | 18.68% | 19.01% |
| NP/c | 5.82% | 5.92% | 5.85% | 5.84% | 5.75% | 5.83% | 5.72% | 5.82% |
| Nx/c | 24.77% | 25.12% | 24.93% | 24.65% | 24.64% | 24.88% | 24.40% | 24.83% |
| NB/h | 18.32% | 18.86% | 18.63% | 18.57% | 18.65% | 18.68% | 18.08% | 18.51% |
| NP/h | 5.77% | 5.92% | 5.85% | 5.91% | 5.81% | 5.84% | 5.63% | 5.77% |
| Nx/h | 24.09% | 24.78% | 24.48% | 24.48% | 24.46% | 24.52% | 23.71% | 24.28% |
| stabi. | 97.25% | 98.67% | 98.20% | 99.29% | 99.27% | 98.58% | 97.14% | 97.80% |
| Coat. conc. | | | | | | | | |
| NB/a | | | | | | | | |
| NP/a | | | | | | | | |
| Nx/a | | | | | | | | |
| NB/b | | | | | | | | |
| NP/b | | | | | | | | |
| Nx/b | | | | | | | | |
| dev. | | | | | | | | |

| | Ex# | | | | | | | |
|---|---|---|---|---|---|---|---|---|
| | 310016 Inv. | 310017 Inv. | 310021 Inv. | 310024 Inv. | 310025 Inv. | 310026 Inv. | 310027 Inv. | 310028 Inv. |
| (A) PG | 29.67% LT ad100 | 29.67% LT ad100 | 29.67% LT ad100 | 29.67% LT ad100 | 29.67% LT ad100 | 29.67% LT ad100 | 29.67% LT ad100 | 29.67% LT ad100 |
| BZ | | | | | | | | |
| (C)i | 20% LFG | 20% LGA | 20% NMM | 10% LES | 10% LFG | 10% LGA | 10% TEA | 10% NMM |
| (C)ii | | | | | | | | |
| (D) | | | | 10% SEA | 10% SEA | 10% SEA | 10% SEA | 10% SEA |
| other colo. | | | | | | | | |
| visc. | 423 | 598 | 39 | 46 | 167 | 173 | 71 | 46 |
| pH | 10.7 | 10.6 | 9.4 | 9.3 | 10.3 | 10.2 | 9.2 | 9.1 |
| NB/c | 18.99% | 19.06% | 18.93% | 18.85% | 18.72% | 18.71% | 18.84% | 18.73% |
| NP/c | 5.83% | 5.86% | 5.79% | 5.97% | 5.90% | 5.92% | 6.13% | 6.04% |
| Nx/c | 24.82% | 24.92% | 24.72% | 24.82% | 24.62% | 24.63% | 24.97% | 24.77% |
| NB/h | 18.50% | 18.25% | 18.80% | 18.58% | 18.59% | 18.80% | 18.27% | 18.73% |
| NP/h | 5.78% | 5.70% | 6.06% | 5.89% | 5.87% | 5.94% | 5.92% | 5.96% |

TABLE 2-continued

Examples of the compositions of the invention and of comparative compositions, and data on their viscosity, pH value, storage stability and stability after coated on urea Table 2

| | | | | | | | | |
|---|---|---|---|---|---|---|---|---|
| Nx/h | 24.28% | 23.95% | 24.86% | 24.47% | 24.46% | 24.74% | 24.19% | 24.69% |
| stabi. | 97.81% | 96.10% | 100.54% | 98.59% | 99.36% | 100.45% | 96.88% | 99.70% |
| Coat. | | | | | | | | |
| conc. | | | | | | | | |
| NB/a | | | | | | | | |
| NP/a | | | | | | | | |
| Nx/a | | | | | | | | |
| NB/b | | | | | | | | |
| NP/b | | | | | | | | |
| Nx/b | | | | | | | | |
| dev. | | | | | | | | |

| | Ex# | | | | | | | |
|---|---|---|---|---|---|---|---|---|
| | 310029 Inv. | 310031 Inv. | 310032 Inv. | 310034 Inv. | 310035 Inv. | 310036 Inv. | 310037 Inv. | 310039 Inv. |
| (A) PG BZ | 29.67% LT ad100 | 29.67% LT ad100 | 29.67% LT ad100 | 29.67% LT ad100 | 29.67% LT ad100 | 29.67% LT ad100 | 29.67% LT ad100 | 29.67% LT ad100 |
| (C)i | 10% LES | 10% LGA | 10% TEA | 10% LES | 10% LES | 10% LES | 10% LES | 10% LGA |
| (C)ii | | | | 10% LFG | 10% LGA | 10% NMM | | |
| (D) | 10% DML | 10% DML | 10% DML | 10% DML | 10% DML | 10% DML | 10% HCM | 10% HCM |
| other colo. | | | | | | | | |
| visc. | 67 | 161 | 71 | 179 | 211 | 55 | 60 | 167 |
| pH | 9.4 | 10.4 | 9.3 | 10.5 | 10.4 | 9.4 | 9.4 | 10.4 |
| NB/c | 18.79% | 19.06% | 19.03% | 18.51% | 18.71% | 18.98% | 18.96% | 18.84% |
| NP/c | 5.80% | 5.90% | 5.88% | 5.73% | 5.76% | 6.08% | 5.88% | 5.83% |
| Nx/c | 24.59% | 24.96% | 24.91% | 24.24% | 24.47% | 25.06% | 24.84% | 24.67% |
| NB/h | 18.87% | 18.98% | 18.71% | 18.62% | 18.74% | 18.98% | 18.93% | 18.79% |
| NP/h | 5.83% | 5.86% | 5.80% | 5.76% | 5.79% | 6.03% | 5.87% | 5.82% |
| Nx/h | 24.70% | 24.84% | 24.51% | 24.38% | 24.53% | 25.01% | 24.80% | 24.61% |
| stabi. | 100.46% | 99.52% | 98.37% | 100.60% | 100.22% | 99.80% | 99.83% | 99.73% |
| Coat. | | | | | | | | |
| conc. | | | | | | | | |
| NB/a | | | | | | | | |
| NP/a | | | | | | | | |
| Nx/a | | | | | | | | |
| NB/b | | | | | | | | |
| NP/b | | | | | | | | |
| Nx/b | | | | | | | | |
| dev. | | | | | | | | |

| | Ex# | | | | | | | |
|---|---|---|---|---|---|---|---|---|
| | 310040 Inv. | 310041 Inv. | 310044 Inv. | 310045 Inv. | 310046 Inv. | 310047 Inv. | 310048 Inv. | 310049 Inv. |
| (A) PG BZ | 29.67% LT ad100 | 29.67% LT ad100 | 29.67% LT ad100 | 29.67% LT ad100 | 29.67% LT ad100 | 29.67% LT ad100 | 29.67% LT ad100 | 29.67% LT ad100 |
| (C)i | 10% TEA | 10% NMM | | | | 1% LFG | 3% LFG | 10% LFG |
| (C)ii | | | | | | | | |
| (D) | 10% HCM | 10% HCM | 20% HCM | 20% SEA | 20% DML | 20% DML | 20% DML | 20% DML |
| other colo. | | | 0.25% | 0.25% | 0.25% | 0.25% | 0.25% | 0.25% |
| visc. | 72 | 46 | 53 | 53 | 51 | 58 | 71 | 144 |
| pH | 9.4 | 9.3 | 8.8 | 7.9 | 8.5 | 9.6 | 10.1 | 10.5 |
| NB/c | 18.83% | 18.64% | 18.48% | 18.77% | 18.70% | 18.61% | 18.62% | 18.62% |
| NP/c | 5.78% | 6.10% | 5.79% | 5.90% | 5.80% | 5.81% | 5.81% | 5.78% |
| Nx/c | 24.61% | 24.74% | 24.27% | 24.67% | 24.50% | 24.42% | 24.43% | 24.40% |
| NB/h | 18.54% | 18.78% | 18.50% | 18.46% | 18.67% | 18.75% | 18.67% | 18.67% |
| NP/h | 5.75% | 5.95% | 5.79% | 5.82% | 5.78% | 5.83% | 5.82% | 5.80% |
| Nx/h | 24.29% | 24.73% | 24.29% | 24.28% | 24.45% | 24.58% | 24.49% | 24.47% |
| stabi. | 98.70% | 100.00% | 100.08% | 98.43% | 99.80% | 100.65% | 100.26% | 100.30% |
| Coat. | | | | | | | | |
| conc. | | | 0.10% | 0.09% | 0.10% | 0.10% | 0.10% | 0.10% |
| NB/a | | | 0.057% | 0.060% | 0.064% | 0.063% | 0.065% | 0.067% |
| NP/a | | | 0.017% | 0.019% | 0.020% | 0.019% | 0.020% | 0.021% |
| Nx/a | | | 0.074% | 0.079% | 0.084% | 0.082% | 0.085% | 0.088% |
| NB/b | | | 0.004% | 0.008% | 0.010% | 0.011% | 0.024% | 0.054% |
| NP/b | | | 0.002% | 0.003% | 0.004% | 0.004% | 0.008% | 0.017% |
| Nx/b | | | 0.006% | 0.011% | 0.014% | 0.015% | 0.032% | 0.071% |
| dev. | | | −91.89% | −86.08% | −83.33% | −81.71% | −62.35% | −19.32% |

TABLE 2-continued

Examples of the compositions of the invention and of comparative compositions, and data on their viscosity, pH value, storage stability and stability after coated on urea Table 2

| Ex# | 310050 Inv. | 310051 Inv. | 310052 Inv. | 310053 Inv. | 310059 Inv. | 310060 Inv. | 310061 Inv. | 310062 Inv. |
|---|---|---|---|---|---|---|---|---|
| (A) | 29.67% LT | 29.67% LT | 29.67% LT | 29.67% LT | 29.67% LT | 29.67% LT | 29.67% LT | 29.67% LT |
| PG | ad100 | ad100 | ad100 | ad100 | 50.33% | 55.33% | 50.33% | 50.33% |
| BZ | | | | | | | | |
| (C)i | 1% NMM | 3% NMM | 10% NMM | 20% NMM | 10% LES | 5% LES | 5% NMM | 5% TEA |
| (C)ii | | | | | | | 5% LES | 5% LES |
| (D) | 20% DML | 20% DML | 20% DML | 20% DML | 10% DML | 10% DML | 10% DML | 10% DML |
| other | | | | | | | | |
| colo. | 0.25% | 0.25% | 0.25% | 0.25% | 0.25% | 0.25% | 0.25% | 0.25% |
| visc. | 55 | 51 | 48 | 43 | 73 | 66 | 62 | 76 |
| pH | 8.7 | 8.9 | 9.2 | 9.3 | 9.4 | 9.2 | 9.3 | 9.4 |
| NB/c | 19.13% | 18.87% | 18.59% | 20.40% | 19.00% | 19.10% | 19.05% | 18.95% |
| NP/c | 5.93% | 5.88% | 5.86% | 6.42% | 6.01% | 6.04% | 6.04% | 5.93% |
| Nx/c | 25.06% | 24.75% | 24.45% | 26.82% | 25.01% | 25.14% | 25.09% | 24.88% |
| NB/h | 19.05% | 19.00% | 19.26% | 21.64% | 19.17% | 19.10% | 19.30% | 18.94% |
| NP/h | 5.92% | 5.88% | 5.93% | 6.90% | 6.02% | 5.99% | 6.04% | 5.93% |
| Nx/h | 24.97% | 24.88% | 25.19% | 28.54% | 25.19% | 25.09% | 25.34% | 24.87% |
| stabi. | 99.64% | 100.53% | 103.05% | 106.40% | 100.74% | 99.81% | 101.02% | 99.98% |
| Coat. | | | | | | | | |
| conc. | 0.10% | 0.10% | 0.09% | 0.10% | 0.10% | 0.09% | 0.10% | 0.10% |
| NB/a | 0.067% | 0.062% | 0.061% | 0.048% | 0.068% | 0.065% | 0.065% | 0.066% |
| NP/a | 0.021% | 0.019% | 0.019% | 0.015% | 0.021% | 0.020% | 0.020% | 0.020% |
| Nx/a | 0.088% | 0.081% | 0.080% | 0.063% | 0.089% | 0.085% | 0.085% | 0.086% |
| NB/b | 0.011% | 0.009% | 0.009% | 0.010% | 0.012% | 0.011% | 0.008% | 0.037% |
| NP/b | 0.004% | 0.003% | 0.003% | 0.003% | 0.002% | 0.002% | 0.001% | 0.007% |
| Nx/b | 0.015% | 0.012% | 0.012% | 0.013% | 0.014% | 0.013% | 0.009% | 0.044% |
| dev. | −82.95% | −85.19% | −85.00% | −79.37% | −84.27% | −84.71% | −89.41% | −48.84% |

| Ex# | 310063 Inv. | 310064 Inv. | 310065 Inv. | 310066 Inv. | 310077 Inv. | 310078 Inv. | 310079 Inv. | 310080 Inv. |
|---|---|---|---|---|---|---|---|---|
| (A) | 29.67% LT | 29.67% LT | 29.67% LT | 29.67% LT | 29.67% LT | 29.67% LT | 29.67% LT | 29.67% LT |
| PG | 50.33% | 50.33% | 53.33% | 48.33% | 60.08% | 55.08% | 50.08% | 60.08% |
| BZ | | | | | | | | |
| (C)i | 5% LES | 5% LES | 2% LFG | 2% LFG | 10% LFG | 15% LFG | 20% LFG | 8% LFG |
| (C)ii | | | 5% LES | 5% LES | | | | 2% LES |
| (D) | 10% DML | 10% DML | 10% DML | 10% DML | | | | |
| other | 5% BDA | 5% MDA | | | | | | |
| colo. | 0.25% | 0.25% | 0.25% | 0.25% | 0.25% | 0.25% | 0.25% | 0.25% |
| visc. | 69 | 71 | 83 | 72 | 175 | 286 | 486 | 153 |
| pH | 9.8 | 9.7 | 10.0 | 9.9 | 10.5 | 10.6 | 10.7 | 10.4 |
| NB/c | 18.86% | 18.78% | 18.84% | 18.97% | 19.12% | 19.18% | 19.15% | 19.15% |
| NP/c | 5.96% | 5.93% | 5.96% | 6.03% | 6.17% | 6.19% | 6.19% | 6.22% |
| Nx/c | 24.82% | 24.71% | 24.80% | 25.00% | 25.29% | 25.37% | 25.34% | 25.37% |
| NB/h | 18.83% | 18.93% | 18.79% | 19.16% | 19.02% | 19.13% | 18.99% | 18.98% |
| NP/h | 5.92% | 5.96% | 5.91% | 6.01% | 6.07% | 6.07% | 6.06% | 5.98% |
| Nx/h | 24.75% | 24.89% | 24.70% | 25.17% | 25.09% | 25.20% | 25.05% | 24.96% |
| stabi. | 99.70% | 100.72% | 99.61% | 100.66% | 99.24% | 99.33% | 98.84% | 98.38% |
| Coat. | | | | | | | | |
| conc. | 0.10% | 0.10% | 0.10% | 0.10% | 0.08% Target | 0.08% Target | 0.08% Target | 0.08% Target |
| NB/a | 0.063% | 0.068% | 0.068% | 0.067% | 0.056% | 0.058% | 0.058% | 0.054% |
| NP/a | 0.019% | 0.021% | 0.021% | 0.021% | 0.018% | 0.019% | 0.019% | 0.018% |
| Nx/a | 0.082% | 0.089% | 0.089% | 0.088% | 0.074% | 0.077% | 0.077% | 0.072% |
| NB/b | 0.038% | 0.040% | 0.017% | 0.017% | 0.048% | 0.053% | 0.048% | 0.041% |
| NP/b | 0.008% | 0.008% | 0.003% | 0.003% | 0.014% | 0.016% | 0.014% | 0.011% |
| Nx/b | 0.046% | 0.048% | 0.020% | 0.020% | 0.062% | 0.069% | 0.062% | 0.052% |
| dev. | −43.90% | −46.07% | −77.53% | −77.27% | −16.22% | −10.39% | −19.48% | −27.78% |

| Ex# | 310081 Inv. | 310082 Inv. | 310083 Inv. | 310084 Inv. | 310086 Inv. | 310087 Inv. | 310073 Inv. | 310088 Inv. |
|---|---|---|---|---|---|---|---|---|
| (A) | 29.67% LT | 29.67% LT | 29.67% LT | 29.67% LT | 29.67% LT | 29.67% LT | 29.67% LT | 29.67% LT |
| PG | 50.08% | 50.08% | 50.08% | 50.08% | 49.08% | 47.08% | | |
| BZ | | | | | | | 70.33% | 60.08% |
| (C)i | 10% LFG | 10% LFG | 8% LFG | 8% LFG | 8% LFG | 8% LFG | | 10% LFG |
| (C)ii | | 2% LES | 2% LES | 2% LES | 2% LES | 2% LES | | |
| (D) | 10% DML | 10% HCM | 10% DML | 10% HCM | 10% DML | 10% DML | | |
| other | | | | | 1% TPA | 3% TPA | | |
| colo. | 0.25% | 0.25% | 0.25% | 0.25% | 0.25% | 0.25% | | 0.25% |

TABLE 2-continued

Examples of the compositions of the invention and of comparative compositions, and data on their viscosity, pH value, storage stability and stability after coated on urea Table 2

| | | | | | | | | |
|---|---|---|---|---|---|---|---|---|
| visc. | 152 | 156 | 127 | 127 | 129 | 140 | 11 | 34 |
| pH | 10.5 | 10.5 | 10.4 | 10.4 | 10.4 | 10.4 | 8.5 | 10.6 |
| NB/c | 19.11% | 19.23% | 19.45% | 19.66% | 19.22% | 18.91% | 19.21% | 19.17% |
| NP/c | 6.16% | 6.23% | 6.24% | 6.33% | 6.16% | 6.07% | 6.23% | 6.19% |
| Nx/c | 25.27% | 25.46% | 25.69% | 25.99% | 25.38% | 24.98% | 25.44% | 25.36% |
| NB/h | 19.03% | 19.11% | 19.34% | 19.26% | 19.48% | 19.57% | 18.28% | 19.00% |
| NP/h | 5.96% | 6.01% | 6.08% | 6.06% | 6.10% | 5.97% | 5.93% | 6.13% |
| Nx/h | 24.99% | 25.12% | 25.42% | 25.32% | 25.58% | 25.54% | 24.21% | 25.13% |
| stabi. | 98.90% | 98.66% | 98.94% | 97.44% | 100.78% | 102.24% | −4.85% | −0.91% |
| Coat. | | | | | | | | |
| conc. | 0.08% Target | 0.08% Target | 0.08% Target | 0.08% Target | 0.08% Target | 0.08% Target | | 0.08% Target |
| NB/a | 0.057% | 0.055% | 0.057% | 0.053% | 0.056% | 0.057% | | 0.060% |
| NP/a | 0.019% | 0.018% | 0.018% | 0.017% | 0.018% | 0.019% | | 0.019% |
| Nx/a | 0.076% | 0.073% | 0.075% | 0.070% | 0.074% | 0.076% | | 0.079% |
| NB/b | 0.040% | 0.044% | 0.042% | 0.045% | 0.040% | 0.038% | | 0.049% |
| NP/b | 0.011% | 0.012% | 0.011% | 0.013% | 0.011% | 0.010% | | 0.014% |
| Nx/b | 0.051% | 0.056% | 0.053% | 0.058% | 0.051% | 0.048% | | 0.063% |
| dev. | −32.9% | −23.3% | −29.3% | −17.1% | −31.1% | −36.8% | | −20.25% |

| | Ex# | | | | | | | |
|---|---|---|---|---|---|---|---|---|
| | 310089 Inv. | 310090 Inv. | 310091 Inv. | 310092 Inv. | 310093 Inv. | 310094 Inv. | 310095 Inv. | 310096 Inv. |
| (A) | 29.67% LT | 29.67% LT | 29.67% LT | 29.67% LT | 29.67% LT | 29.67% LT | 29.67% LT | 29.67% LT |
| PG | | | | | | | | |
| BZ | 55.08% | 50.08% | 60.08% | 50.08% | 50.08% | 50.08% | 50.08% | 55.08% |
| (C)i | 15% LFG | 20% LFG | 8% LFG | 10% LFG | 10% LFG | 8% LFG | 8% LFG | |
| (C)ii | | | 2% LES | | | 2% LES | 2% LES | |
| (D) | | | | 10% DML | 10% HCM | 10% DML | 10% HCM | |
| other | | | | | | | | 15% LPN |
| colo. | 0.25% | 0.25% | 0.25% | 0.25% | 0.25% | 0.25% | 0.25% | 0.25% |
| visc. | 70 | 121 | 32 | 42 | 40 | 34 | 34 | 35 |
| pH | 10.6 | 10.7 | 10.5 | 10.5 | 10.5 | 10.4 | 10.5 | 11.4 |
| NB/c | 19.33% | 19.08% | 19.25% | 19.11% | 19.00% | 19.12% | 19.68% | 17.77% |
| NP/c | 6.23% | 6.15% | 6.20% | 6.17% | 6.16% | 6.14% | 6.33% | 5.73% |
| Nx/c | 25.56% | 25.23% | 25.45% | 25.28% | 25.16% | 25.26% | 26.01% | 23.50% |
| NB/h | 18.95% | 19.07% | 19.02% | 18.97% | 18.86% | 19.08% | 19.34% | 15.60% |
| NP/h | 6.15% | 6.18% | 6.14% | 6.07% | 6.08% | 6.14% | 6.24% | 4.92% |
| Nx/h | 25.10% | 25.25% | 25.16% | 25.04% | 24.94% | 25.22% | 25.58% | 20.52% |
| stabi. | −1.82% | 0.09% | −1.15% | −0.97% | −0.89% | −0.15% | −1.65% | −12.68% |
| Coat. | | | | | | | | |
| conc. | 0.08% Target | 0.08% Target | 0.08% Target | 0.08% Target | 0.08% Target | 0.08% Target | 0.08% Target | 0.08% Target |
| NB/a | 0.061% | 0.058% | 0.061% | 0.057% | 0.059% | 0.062% | 0.065% | 0.059% |
| NP/a | 0.019% | 0.018% | 0.019% | 0.018% | 0.018% | 0.019% | 0.020% | 0.019% |
| Nx/a | 0.080% | 0.076% | 0.080% | 0.075% | 0.077% | 0.081% | 0.085% | 0.078% |
| NB/b | 0.052% | 0.051% | 0.046% | 0.049% | 0.050% | 0.051% | 0.048% | 0.050% |
| NP/b | 0.016% | 0.016% | 0.013% | 0.014% | 0.015% | 0.015% | 0.014% | 0.015% |
| Nx/b | 0.068% | 0.067% | 0.059% | 0.063% | 0.065% | 0.066% | 0.062% | 0.065% |
| dev. | −15.00% | −11.84% | −26.25% | −16.00% | −15.58% | −18.52% | −27.06% | −16.67% |

| | Ex# | | | | | | |
|---|---|---|---|---|---|---|---|
| | 310104 Inv. | 310105 Inv. | 310106 Inv. | 310108 Inv. | 310109 Inv. | 310110 Inv. | 310111 Inv. |
| (A) | 29.67% LT | 29.67% LT | 25% NBPT | 29.34% LL | 29.34% LL | 29.34% LL | 29.34% LL |
| PG | | | | | | | |
| BZ | 50.08% | 40.08% | 54.75% | 50.41% | 40.41% | 60.41% | 60.41% |
| (C)i | 20% LFG | 30% LFG | 20% LFG | 20% LFG | 30% LFG | 10% DEI | 10% HBI |
| (C)ii | | | | | | | |
| (D) | | | | | | | |
| other | | | | | | | |
| colo. | 0.25% | 0.25% | 0.25% | 0.25% | 0.25% | 0.25% | 0.25% |
| visc. | 132 | 345 | 94 | 115 | 314 | 18 | 18 |
| pH | 10.5 | 10.6 | 10.7 | 12.3 | 9.1 | 8.7 | 9.1 |
| NB/c | 18.56% | 18.62% | 25.17% | 19.79% | 19.72% | 19.32% | 19.78% |
| NP/c | 5.82% | 5.89% | 0.00% | 6.19% | 6.19% | 6.06% | 6.12% |
| Nx/c | 24.38% | 24.51% | 25.17% | 25.98% | 25.91% | 25.38% | 25.90% |
| NB/h | 18.70% | 19.01% | 25.59% | 19.90% | 19.90% | 19.41% | 19.40% |
| NP/h | 5.95% | 5.94% | 0.00% | 6.21% | 6.18% | 6.16% | 5.88% |
| Nx/h | 24.65% | 24.95% | 25.59% | 26.11% | 26.08% | 25.57% | 25.28% |
| stabi. | 1.11% | 1.80% | 1.67% | 0.50% | 0.66% | 0.75% | −2.39% |
| Coat. | | | | | | | |

TABLE 2-continued

Examples of the compositions of the invention and of comparative compositions, and data on
their viscosity, pH value, storage stability and stability after coated on urea Table 2

| conc. | 0.08% Target | 0.08% Target | 0.08% Target | 0.08% Target | 0.08% Target | 0.08% Target | 0.08% Target |
|---|---|---|---|---|---|---|---|
| NB/a | 0.058% | 0.057% | 0.077% | 0.060% | 0.059% | 0.063% | 0.065% |
| NP/a | 0.019% | 0.019% | 0.000% | 0.019% | 0.019% | 0.019% | 0.020% |
| Nx/a | 0.077% | 0.076% | 0.077% | 0.079% | 0.078% | 0.082% | 0.085% |
| NB/b | | | | | | | |
| NP/b | | | | | | | |
| Nx/b | | | | | | | |
| dev. | | | | | | | |

| | Ex# | | | | | | | |
|---|---|---|---|---|---|---|---|---|
| | 310112 Inv. | 310113 Inv. | 310114 Inv. | 310115 Inv. | 310116 Inv. | 310117 Inv. | 310118 Inv. | 310119 Inv. |
| (A) | 29.34% LL | 29.34% LL | 29.34% LL | 29.34% LL | 29.34% LL | 29.34% LL | 29.34% LL | 29.34% LL |
| PG | | | | | | | 60.41% | 60.41% |
| BZ | 60.41% | 60.41% | 40.41% | 40.41% | 50.41% | 50.41% | | |
| (C)i | 10% E15 | 10% E25 | 30% E15 | 30% E25 | 20% DEI | 10% HBI | 10% DEI | 10% HBI |
| (C)ii | | | | | | | | |
| (D) other | | | | | | | | |
| colo. | 0.25% | 0.25% | 0.25% | 0.25% | 0.25% | 0.25% | 0.25% | 0.25% |
| visc. | 17 | 20 | 42 | 63 | 30 | 31 | 78 | 80 |
| pH | 8.9 | 9.3 | 9.1 | 9.1 | 9.0 | 9.1 | 8.9 | 9.1 |
| NB/c | 19.66% | 19.85% | 19.65% | 19.73% | 19.69% | 19.83% | 19.67% | 19.83% |
| NP/c | 6.16% | 6.20% | 6.16% | 6.20% | 6.98% | 6.04% | 6.09% | 6.14% |
| Nx/c | 25.82% | 26.05% | 25.81% | 25.93% | 26.67% | 25.87% | 25.76% | 25.97% |
| NB/h | 19.50% | 19.65% | 19.55% | 19.68% | 19.53% | 19.61% | 19.32% | 19.76% |
| NP/h | 6.40% | 6.39% | 6.00% | 6.11% | 6.70% | 5.94% | 6.05% | 6.20% |
| Nx/h | 25.90% | 26.04% | 25.55% | 25.79% | 26.23% | 25.55% | 25.37% | 25.96% |
| stabi. | 0.31% | −0.04% | −1.01% | −0.54% | −1.65% | −1.24% | −1.51% | −0.04% |
| Coat. | | | | | | | | |
| conc. | 0.08% Target | 0.08% Target | 0.08% Target | 0.08% Target | 0.08% Target | 0.08% Target | 0.08% Target | 0.08% Target |
| NB/a | 0.064% | 0.062% | 0.060% | 0.059% | 0.059% | 0.058% | 0.056% | 0.064% |
| NP/a | 0.020% | 0.019% | 0.019% | 0.018% | 0.018% | 0.018% | 0.017% | 0.020% |
| Nx/a | 0.084% | 0.081% | 0.079% | 0.077% | 0.077% | 0.076% | 0.073% | 0.084% |
| NB/b | | | | | | | | |
| NP/b | | | | | | | | |
| Nx/b | | | | | | | | |
| dev. | | | | | | | | |

| | Ex# | | | | | | |
|---|---|---|---|---|---|---|---|
| | 310120 Inv. | 310121 Inv. | 310122 Inv. | 310123 Inv. | 310022 Comp. | 310043 Comp. | 310085 Comp. |
| (A) | 29.34% LL | 29.34% LL | 29.34% LL | 29.34% LL | 29.67% LT | 29.67% LT | 29.67% LT |
| PG | 60.41% | 60.41% | 40.41% | 40.41% | ad100 | ad100 | 55.08% |
| BZ | | | | | | | |
| (C)i | 10% E15 | 10% E25 | 30% E15 | 30% E25 | | | |
| (C)ii | | | | | | | |
| (D) other | | | | | 20% LPN | 20% NMP | 15% LPN |
| colo. | 0.25% | 0.25% | 0.25% | 0.25% | | 0.25% | 0.25% |
| visc. | 75 | 81 | 114 | 140 | 181 | 36 | 141 |
| pH | 9.1 | 9.3 | 9.3 | 9.3 | 11.2 | 8.5 | 11.3 |
| NB/c | 20.05% | 19.70% | 20.04% | 19.70% | 18.39% | 18.68% | 18.12% |
| NP/c | 6.25% | 6.14% | 6.25% | 6.13% | 5.71% | 5.86% | 5.83% |
| Nx/c | 26.30% | 25.84% | 26.29% | 25.83% | 24.10% | 24.54% | 23.95% |
| NB/h | 20.07% | 19.77% | 19.82% | 19.39% | 15.67% | 18.52% | 16.38% |
| NP/h | 6.28% | 6.18% | 6.18% | 6.09% | 4.91% | 5.81% | 5.21% |
| Nx/h | 26.35% | 25.95% | 26.00% | 25.48% | 20.58% | 24.33% | 21.59% |
| stabi. | 0.19% | 0.43% | −1.10% | −1.36% | 85.41% | 99.16% | 90.11% |
| Coat. | | | | | | | |
| conc. | 0.08% Target | 0.08% Target | 0.08% Target | 0.08% Target | | 0.10% | 0.08% Target |
| NB/a | 0.063% | 0.062% | 0.062% | 0.062% | | 0.064% | 0.053% |
| NP/a | 0.020% | 0.019% | 0.019% | 0.019% | | 0.019% | 0.016% |
| Nx/a | 0.083% | 0.081% | 0.081% | 0.081% | | 0.083% | 0.069% |
| NB/b | | | | | | 0.005% | 0.039% |
| NP/b | | | | | | 0.002% | 0.010% |
| Nx/b | | | | | | 0.007% | 0.049% |
| dev. | | | | | | −91.57% | −29.0% |

NMP (at least in amounts as applied in Ex# 310043) is toxicologically objectionable.

Further specific embodiments of the invention are described in the following:

1. An composition comprising:
   (A) a mixture comprising at least one (thio)phosphoric acid triamide according to the general formula (I)

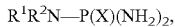

wherein
   X is oxygen or sulfur;
   $R^1$ is a $C_1$ to $C_{20}$ alkyl, $C_3$ to $C_{20}$ cycloalkyl, $C_6$ to $C_{20}$ aryl, or dialkylaminocarbonyl group;
   $R^2$ is H, or
   $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
   and
   (B) an aromatic alcohol according to the general formula (II)

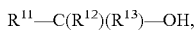

in an amount of more than 10 wt. % based on the total weight of the composition, wherein
   $R^{11}$ is aryl or alkylaryl;
   $R^{12}$ is H or alkyl;
   $R^{13}$ is H or alkyl.
2. The composition according to embodiment 1, wherein in the general formula (I) of (A) X is sulfur.
3. The composition according to embodiment 1 or 2, wherein in the general formula (I) of (A) $R^1$ is $C_1$-$C_{20}$ alkyl and $R^2$ is H.
4. The composition according to anyone of the embodiments 1 to 3, wherein the mixture (A) comprises N-n-butylthiophosphoric acid triamide (NBPT) and/or N-n-propylthiophosphoric acid triamide (NPPT).
5. The composition according to embodiment 1, wherein the mixture (A) comprises at least two different (thio)phosphoric acid triamides having structures of the general formula (I) and wherein said at least two different (thio)phosphoric acid triamides differ in at least one of radicals $R^1$ or $R^2$.
6. The composition according to embodiment 5, wherein one of said at least two different (thio)phosphoric acid triamides is N-n-butylthiophosphoric acid triamide.
7. The composition according to anyone of the embodiments 1 to 6, wherein in the general formula (II) of (B) $R^{12}$ and $R^{13}$ is H.
8. The composition according to anyone of the embodiments 1 to 7, wherein in the general formula (II) of (B) $R^{11}$ is aryl.
9. The composition according to anyone of the embodiments 1 to 8, wherein in the general formula (II) of (B) $R^{11}$ is phenyl.
10. The composition according to anyone of the embodiments 1 to 9, wherein (B) is benzyl alcohol.
11. The composition according to embodiment 1, wherein the mixture (A) comprises N-n-butylthiophosphoric acid triamide (NBPT) and/or N-n-propylthiophosphoric acid triamide (NPPT) and
    (B) is benzyl alcohol.
12. The composition according to anyone of the embodiments 1 to 11, further comprising
    (C) at least one amine selected from the group consisting of
       (C1) a polymeric polyamine, and
       (C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$, and
       (C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$, and
       (C4) an amine containing at least one saturated or unsaturated $C_8$ to $C_{40}$ alkyl group $R^{23}$, and
       (C5) a saturated or unsaturated heterocyclic amine which contains at least one oxygen atom as ring atom and which does not contain a further alkoxy group.
13. The composition according to anyone of the embodiments 1 to 12, further comprising
    (C) an amine which is
       (C1) a polymeric polyamine.
14. The composition according to anyone of the embodiments 1 to 12, wherein (C1) is a polyalkylene imine.
15. The composition according to anyone of the embodiments 1 to 12, wherein (C1) is a polyethylene imine.
16. The composition according to anyone of the embodiments 1 to 12, further comprising
    (C) an amine which is
       (C2) an amine containing not more than one amino group and at least three alkoxy- or hydroxy-substituted $C_2$ to $C_{12}$ alkyl groups, wherein at least one of the groups $R^{21}$ is different to the other groups $R^{21}$.
17. The composition according to anyone of the embodiments 1 to 12, further comprising (C2) an amine containing not more than one amino group and at least three hydroxy-substituted $C_2$ to $C_3$ alkyl groups which are covalently bound to the amino group.
18. The composition according to anyone of the embodiments 1 to 12, further comprising (C2) an amine selected from the group consisting of Bis(hydroxyethyl)-isopropanolamine (DEIPA), and 1,1'-((2-Hydroxyethyl)imino)dipropan-2-ol.
19. The composition according to anyone of the embodiments 1 to 12, further comprising
    (C) an amine which is
       (C3) an amine containing not more than one amino group and at least two alkoxy- or hydroxy-substituted $C_2$ to $C_{12}$ alkyl groups, wherein at least one of said alkyl groups bears the alkoxy or hydroxy substituent at a secondary or tertiary carbon atom and wherein at least one of the groups $R^{22}$ is different to the other group(s) $R^{22}$.
20. The composition according to anyone of the embodiments 1 to 12, further comprising (C3) an amine selected from the group consisting of 1-((2-hydroxyethyl)amino)propan-2-ol, and N-Methyl-N-hydroxyethyl-isopropanolamine.
21. The composition according to anyone of the embodiments 1 to 12, further comprising
    (C) an amine which is
       (C4) an amine containing at least one saturated or unsaturated $C_8$ to $C_{40}$ alkyl group $R^{23}$.

22. The composition according to anyone of the embodiments 1 to 12, further comprising (C4) an amine containing at least one saturated or unsaturated $C_8$ to $C_{19}$ alkyl group $R^{23}$.
23. The composition according to anyone of the embodiments 1 to 12, further comprising (C4) an amine selected from the group consisting of ethoxylated (2) cocoalkylamine, ethoxylated (5) cocoalkylamine, ethoxylated (15) cocoalkylamine, ethoxylated (2) oleylamine, lauryl-dimethylamine, oleyl-dimethylamine, and 2-propylheptylamine ethoxylate (5 EO), 2-propylheptylamine ethoxylate (10 EO), and 2-propylheptylamine ethoxylate (20 EO).
24. The composition according to anyone of the embodiments 1 to 12, further comprising
   (C) an amine which is
      (C5) a saturated or unsaturated heterocyclic amine which contain at least one oxygen atom as ring atom and which do not contain a further alkoxy group.
25. The composition according to anyone of the embodiments 1 to 12, further comprising (C5) an amine which is N-methyl morpholine.
26. The composition according to anyone of the embodiments 1 to 25, further comprising
   (D) at least one amide according to the general formula (III)

$R^{31}CO-NR^{32}R^{33}$ wherein
   $R^{31}CO$ is an acyl radical having 1 to 22 carbon atoms;
   $R^{32}$ is H or alkyl, and
   $R^{33}$ is H or alkyl, or
   $R^{32}$ and $R^{33}$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.
27. The composition according to anyone of the embodiments 1 to 26, wherein in the general formula (III) of (D) $R^{32}$ is H or $C_1$ to $C_4$ alkyl, and $R^{33}$ is H or $C_1$ to $C_4$ alkyl.
28. The composition according to anyone of the embodiments 1 to 27, wherein in the general formula (III) of (D) $R^{31}CO$ is a hydroxysubstituted acyl radical having 1 to 22 carbon atoms.
29. The composition according to anyone of the embodiments 1 to 28, wherein (D) is a N,N-dialkyl amide based on lactic acid, citric acid, tartaric acid, ricinoleic acid, 12-hydroxy stearic acid, or their mixtures.
30. The composition according to anyone of the embodiments 1 to 29, wherein (D) is a lactic acid N,N-dimethylamide.
31. The composition according to anyone of the embodiments 1 to 27, wherein in the general formula (III) of (D) $R^{31}CO$ does not contain a hydroxy group.
32. The composition according to anyone of the embodiments 1 to 27 and 31, wherein in the general formula (III) of (D) $R^{31}CO$ is an acyl radical having 6 to 12 carbon atoms.
33. The composition according to anyone of the embodiments 1 to 27 and 31 to 32, wherein (D) is selected from the group consisting of N,N-dimethyloctanamide, N,N-dimethylnonanamide, and N,N-dimethyldecanamide.
34. The composition according to anyone of the embodiments 1 to 27 and 31, wherein in the general formula (III) of (D) $R^{31}CO$ is an acyl radical having 1 to 3 carbon atoms.
35. The composition according to anyone of the embodiments 1 to 26, wherein in the general formula (III) of (D) $R^{32}$ and $R^{33}$ together with the nitrogen atom linking them define a 5- or 6-membered saturated or unsaturated heterocyclic radical which optionally comprises 1 or 2 further heteroatoms selected from the group consisting of nitrogen, oxygen, and sulfur.
36. The composition according to anyone of the embodiments 1 to 26 and 35, wherein in the general formula (III) of (D) $R^{32}$ and $R^{33}$ together with the nitrogen atom linking them define a 6-membered saturated heterocyclic radical which comprises one further oxygen heteroatom.
37. The composition according to anyone of the embodiments 1 to 26 and 35 to 36, wherein (D) is N-acetylmorpholine or N-formylmorpholine.
38. The composition according to anyone of the embodiments 1 to 26 and 35, wherein in the general formula (III) of (D) $R^{32}$ and $R^{33}$ together with the nitrogen atom linking them define a 5-membered saturated heterocyclic radical which comprises one further nitrogen heteroatom.
39. The composition according to anyone of the embodiments 1 to 26, 35, and 38, wherein (D) is 1,3-dimethyl-2-imidazolidinone.
40. The composition according to anyone of the embodiments 1 to 27, wherein in the general formula (III) of (D) $R^{32}$ is an acyloxy substituted alkyl group.
41. The composition according to anyone of the embodiments 1 to 27, wherein in the general formula (III) of (D) $R^{31}CO$ is an acyl radical having 1 to 4 carbon atoms, $R^{32}$ is an acyloxy substituted alkyl group and $R^{33}$ is $C_1$ to C4 alkyl.
42. The composition according to anyone of the embodiments 1 to 27, wherein (D) is N-[2-(acetyloxy)ethyl]-N-methyl acetamide.
43. The composition according to anyone of the embodiments 1 to 42, further comprising (E) an alcohol comprising at least two hydroxy groups which are not dissociable in the aqueous medium.
44. The composition according to anyone of the embodiments 1 to 42, further comprising (E) propane-1,2-diol (alpha-propylene glycol).
45. The composition according to anyone of the embodiments 1 to 44, further comprising a compound (K) selected from the group consisting of
(K1) an amine selected from the group consisting of methyldiethanolamine, tetrahydroxy-propylethylenediamine, trimethylaminoethylethanolamine, N,N,N'N'-tetramethyl-1,6-hexanediamine, N,N',N'''-tris(dimethylaminopropyl)hexahydrotriazine, and 2,2'-dimorpholinyldiethyl ether,
(K2) an amine containing not more than one amino group and at least three alkoxy- or hydroxy-substituted $C_2$ to $C_{12}$ alkyl groups $R^{41}$, wherein all groups $R^{41}$ within said amine are identical, and
(K3) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical.

46. The composition according to anyone of the embodiments 1 to 45, further comprising (F) a nitrogen-containing fertilizer.
47. The composition according to anyone of the embodiments 1 to 45, further comprising (F1) a urea-containing fertilizer comprising at least one component selected from the group consisting of urea, urea ammonium nitrate (UAN), isobutylidene diurea (IBDU), crotonylidene diurea (CDU) and urea formaldehyde (UF), urea-acetaldehyde, and urea-glyoxal condensates.
48. The composition according to anyone of the embodiments 1 to 45, further comprising (F) a nitrogen-containing fertilizer which comprises urea.
49. Process for treating the soil comprising:
    applying the composition according to anyone of the embodiments 1 to 48 into the soil in-furrow and/or as side-dress and/or as broadcast.
50. Process according to embodiment 49 comprising:
    applying the composition by spraying it onto the soil.
51. Process according to embodiment 49, wherein the composition is—either at the same time or with a time difference—applied together with at least one nitrogen-containing fertilizer (F) into the soil in-furrow and/or as side-dress and/or as broadcast.
52. Use of the composition according to anyone of the embodiments 1 to 45 as additive or coating material for nitrogen-containing fertilizers (F).
101. An composition comprising:
    (A) a mixture comprising at least one (thio)phosphoric acid triamide according to the general formula (I)

$R^1R^2N-P(X)(NH_2)_2$, wherein
    X is oxygen or sulfur;
    $R^1$ is a $C_1$ to $C_{20}$ alkyl, $C_3$ to $C_{20}$ cycloalkyl, $C_6$ to $C_{20}$ aryl, or dialkylaminocarbonyl group;
    $R^2$ is H, or
    $R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
    and
    (C) at least one amine selected from the group consisting of
    (C1) a polymeric polyamine, and
    (C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$, and
    (C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$, and
    (C4) an amine containing at least one saturated or unsaturated $C_8$ to $C_{40}$ alkyl group $R^{23}$, and
    (C5) a saturated or unsaturated heterocyclic amine which contains at least one oxygen atom as ring atom and which does not contain a further alkoxy group.
102. The composition according to embodiment 101, wherein in the general formula (I) of (A) X is sulfur.
103. The composition according to embodiment 101 or 102, wherein in the general formula (I) of (A) $R^1$ is $C_1$-$C_{20}$ alkyl and $R^2$ is H.
104. The composition according to anyone of the embodiments 101 to 103, wherein the mixture (A) comprises N-n-butylthiophosphoric acid triamide (NBPT) and/or N-n-propylthiophosphoric acid triamide (NPPT).
105. The composition according to embodiment 101, wherein the mixture (A) comprises at least two different (thio)phosphoric acid triamides having structures of the general formula (I) and wherein said at least two different (thio)phosphoric acid triamides differ in at least one of radicals $R^1$ or $R^2$.
106. The composition according to embodiment 105, wherein one of said at least two different (thio)phosphoric acid triamides is N-n-butylthiophosphoric acid triamide.
107. The composition according to anyone of the embodiments 101 to 106, wherein (C) is
    (C1) a polymeric polyamine.
108. The composition according to anyone of the embodiments 101 to 106, wherein (C) is (C1) which is a polyalkylene imine.
109. The composition according to anyone of the embodiments 101 to 106, wherein (C) is (C1) which is a polyethylene imine.
110. The composition according to anyone of the embodiments 101 to 106, wherein (C) is
    (C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$.
111. The composition according to anyone of the embodiments 101 to 106, wherein (C) is (C2) an amine containing not more than one amino group and at least three hydroxy-substituted $C_2$ to $C_3$ alkyl groups which are covalently bound to the amino group.
112. The composition according to anyone of the embodiments 101 to 106, wherein (C) is (C2) an amine selected from the group consisting of Bis(hydroxyethyl)-isopropanolamine (DEIPA), and 1,1'-((2-Hydroxyethyl)imino)dipropan-2-ol.
113. The composition according to anyone of the embodiments 101 to 106, wherein (C) is
    (C3) an amine containing not more than one amino group and at least two alkoxy- or hydroxy-substituted $C_2$ to $C_{12}$ alkyl groups $R^{22}$, wherein at least one of said alkyl groups bears the alkoxy or hydroxy substituent at a secondary or tertiary carbon atom and wherein at least one of the groups $R^{22}$ is different to the other group(s) $R^{22}$.
114. The composition according to anyone of the embodiments 101 to 106, wherein (C) is (C3) an amine selected from the group consisting of 1-((2-hydroxyethyl)amino)propan-2-ol, and N-Methyl-N-hydroxyethyl-isopropanolamine.
115. The composition according to anyone of the embodiments 101 to 106, wherein (C) is (C) an amine which is
    (C4) an amine containing at least one saturated or unsaturated $C_8$ to C40 alkyl group $R^{23}$.
116. The composition according to anyone of the embodiments 101 to 106, wherein (C) is (C4) an amine containing at least one saturated or unsaturated C8 to C19 alkyl group $R^{23}$.
117. The composition according to anyone of the embodiments 101 to 106, wherein (C) is (C4) an amine selected from the group consisting of ethoxylated (2) cocoalkylamine, ethoxylated (5) cocoalkylamine, ethoxylated (15) cocoalkylamine, ethoxylated (2) oleylamine, oleyl-dimethylamine, lauryl-dimethylamine, and 2-propylheptylamine ethoxylate (5 EO), 2-propylheptylamine ethoxylate (10 EO), and 2-propylheptylamine ethoxylate (20 EO).
118. The composition according to anyone of the embodiments 101 to 106, wherein (C) is
    (C5) a saturated or unsaturated heterocyclic amine which contain at least one oxygen atom as ring atom and which do not contain a further alkoxy group.
119. The composition according to anyone of the embodiments 101 to 106, wherein (C) is (C5) an amine which is N-methyl morpholine.
120. The composition according to embodiment 101, wherein
    the mixture (A) comprises N-n-butylthiophosphoric acid triamide (NBPT) and/or N-n-propylthiophosphoric acid triamide (NPPT) and
    (C) is (C1) a polymeric polyamine which is polyethyleneimine.
121. The composition according to anyone of the embodiments 101 to 120, further comprising
    (B) an aromatic alcohol according to the general formula (II)

$R^{11}-C(R^{12})(R^{13})-OH$ wherein
    $R^{11}$ is aryl or alkylaryl;
    $R^{12}$ is H or alkyl;
    $R^{13}$ is H or alkyl.
122. The composition according to anyone of the embodiments 101 to 121, further comprising (B), wherein in the general formula (II) of (B) $R^{12}$ and $R^{13}$ is H.
123. The composition according to anyone of the embodiments 101 to 122, further comprising (B), wherein in the general formula (II) of (B) $R^{11}$ is aryl.
124. The composition according to anyone of the embodiments 101 to 123, further comprising (B), wherein in the general formula (II) of (B) $R^{11}$ is phenyl.
125. The composition according to anyone of the embodiments 101 to 124, further comprising (B), wherein (B) is benzyl alcohol.
126. The composition according to anyone of the embodiments 101 to 125, further comprising
    (D) at least one amide according to the general formula (III)

$R^{31}CO-NR^{32}R^{33}$ wherein
    $R^{31}CO$ is an acyl radical having 1 to 22 carbon atoms;
    $R^{32}$ is H or alkyl, and
    $R^{33}$ is H or alkyl, or
    $R^{32}$ and $R^{33}$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.
127. The composition according to anyone of the embodiments 101 to 126, wherein in the general formula (III) of (D) $R^{32}$ is H or $C_1$ to $C_4$ alkyl, and $R^{33}$ is H or $C_1$ to $C_4$ alkyl.
128. The composition according to anyone of the embodiments 101 to 127, wherein in the general formula (III) of (D) $R^{31}CO$ is a hydroxysubstituted acyl radical having 1 to 22 carbon atoms.
129. The composition according to anyone of the embodiments 101 to 128, wherein (D) is a N,N-dialkyl amide based on lactic acid, citric acid, tartaric acid, ricinoleic acid, 12-hydroxy stearic acid, or their mixtures.
130. The composition according to anyone of the embodiments 101 to 129, wherein (D) is a lactic acid N,N-dimethylamide.
131. The composition according to anyone of the embodiments 101 to 127, wherein in the general formula (III) of (D) $R^{31}CO$ does not contain a hydroxy group.
132. The composition according to anyone of the embodiments 101 to 127 and 131, wherein in the general formula (III) of (D) $R^{31}CO$ is an acyl radical having 6 to 12 carbon atoms.
133. The composition according to anyone of the embodiments 101 to 127 and 131 to 132, wherein (D) is selected from the group consisting of N,N-dimethyloctanamide, N,N-dimethylnonanamide, and N,N-dimethyldecanamide.
134. The composition according to anyone of the embodiments 101 to 127 and 131, wherein in the general formula (III) of (D) $R^{31}CO$ is an acyl radical having 1 to 3 carbon atoms.
135. The composition according to anyone of the embodiments 101 to 126, wherein in the general formula (III) of (D) $R^{32}$ and $R^{33}$ together with the nitrogen atom linking them define a 5- or 6-membered saturated or unsaturated heterocyclic radical which optionally comprises 1 or 2 further heteroatoms selected from the group consisting of nitrogen, oxygen, and sulfur.
136. The composition according to anyone of the embodiments 101 to 126 and 135, wherein in the general formula (III) of (D) $R^{32}$ and $R^{33}$ together with the nitrogen atom linking them define a 6-membered saturated heterocyclic radical which comprises one further oxygen heteroatom.
137. The composition according to anyone of the embodiments 101 to 126 and 135 to 136, wherein (D) is N-acetylmorpholine or N-formylmorpholine.
138. The composition according to anyone of the embodiments 101 to 126 and 135, wherein in the general formula (III) of (D) $R^{32}$ and $R^{33}$ together with the nitrogen atom linking them define a 5-membered saturated heterocyclic radical which comprises one further nitrogen heteroatom.
139. The composition according to anyone of the embodiments 101 to 126, 135, and 138, wherein (D) is 1,3-dimethyl-2-imidazolidinone.
140. The composition according to anyone of the embodiments 101 to 127, wherein in the general formula (III) of (D) $R^{32}$ is an acyloxy substituted alkyl group.
141. The composition according to anyone of the embodiments 101 to 127, wherein in the general formula (III) of (D) $R^{31}CO$ is an acyl radical having 1 to 4 carbon atoms, $R^{32}$ is an acyloxy substituted alkyl group and $R^{33}$ is $C_1$ to $C_4$ alkyl.
142. The composition according to anyone of the embodiments 101 to 127, wherein (D) is N-[2-(acetyloxy)ethyl]-N-methyl acetamide.
143. The composition according to anyone of the embodiments 101 to 142, further comprising (E) an alcohol comprising at least two hydroxy groups which are not dissociable in the aqueous medium.

144. The composition according to anyone of the embodiments 101 to 142, further comprising (E) propane-1,2-diol (alpha-propylene glycol).

145. The composition according to anyone of the embodiments 101 to 144, further comprising a compound (K) selected from the group consisting of
(K1) an amine selected from the group consisting of methyldiethanolamine, tetrahydroxy-propylethylenediamine, trimethylaminoethylethanolamine, N,N,N',N'-tetramethyl-1,6-hexanediamine, N,N',N''-tris(dimethylaminopropyl)hexahydrotriazine, and 2,2'-dimorpholinyldiethyl ether,
(K2) an amine containing not more than one amino group and at least three alkoxy- or hydroxy-substituted $C_2$ to $C_{12}$ alkyl groups $R^{41}$, wherein all groups $R^{41}$ within said amine are identical, and
(K3) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical.

146. The composition according to anyone of the embodiments 101 to 145, further comprising (F) a nitrogen-containing fertilizer.

147. The composition according to anyone of the embodiments 101 to 145, further comprising (F1) a urea-containing fertilizer comprising at least one component selected from the group consisting of urea, urea ammonium nitrate (UAN), isobutylidene diurea (IBDU), crotonylidene diurea (CDU) and urea formaldehyde (UF), urea-acetaldehyde, and urea-glyoxal condensates.

148. The composition according to anyone of the embodiments 101 to 145, further comprising (F) a nitrogen-containing fertilizer which comprises urea.

149. Process for treating the soil comprising:
applying the composition according to anyone of the embodiments 101 to 148 into the soil in-furrow and/or as side-dress and/or as broadcast.

150. Process according to embodiment 149 comprising:
applying the composition by spraying it onto the soil.

151. Process according to embodiment 149, wherein the composition is—either at the same time or with a time difference—applied together with at least one nitrogen-containing fertilizer (F) into the soil in-furrow and/or as side-dress and/or as broadcast.

152. Use of the composition according to anyone of the embodiments 101 to 145 as additive or coating material for nitrogen-containing fertilizers (F).

201. An composition comprising:
(A) a mixture comprising at least one (thio)phosphoric acid triamide according to the general formula (I)

$R^1R^2N—P(X)(NH_2)_2$, wherein
X is oxygen or sulfur;
$R^1$ is a $C_1$ to $C_{20}$ alkyl, $C_3$ to $C_{20}$ cycloalkyl, $C_6$ to $C_{20}$ aryl, or dialkylaminocarbonyl group;
$R^2$ is H, or
$R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
and
(D) at least one amide according to the general formula (III)

$R^{31}CO—NR^{32}R^{33}$ wherein
$R^{31}CO$ is an acyl radical having 1 to 22 carbon atoms;
$R^{32}$ is H or alkyl, and
$R^{33}$ is H or alkyl, or
$R^{32}$ and $R^{33}$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.

202. The composition according to embodiment 201, wherein in the general formula (I) of (A) X is sulfur.

203. The composition according to embodiment 201 or 202, wherein in the general formula (I) of (A) $R^1$ is $C_1$-$C_{20}$ alkyl and $R^2$ is H.

204. The composition according to anyone of the embodiments 201 to 203, wherein the mixture (A) comprises N-n-butylthiophosphoric acid triamide (NBPT) and/or N-n-propylthiophosphoric acid triamide (NPPT).

205. The composition according to embodiment 201, wherein the mixture (A) comprises at least two different (thio)phosphoric acid triamides having structures of the general formula (I) and wherein said at least two different (thio)phosphoric acid triamides differ in at least one of radicals $R^1$ or $R^2$.

206. The composition according to embodiment 205, wherein one of said at least two different (thio)phosphoric acid triamides is N-n-butylthiophosphoric acid triamide.

207. The composition according to anyone of the embodiments 201 to 206, wherein in the general formula (III) of (D) $R^{32}$ is H or $C_1$ to $C_4$ alkyl, and $R^{33}$ is H or $C_1$ to $C_4$ alkyl.

208. The composition according to anyone of the embodiments 201 to 207, wherein in the general formula (III) of (D) $R^{31}CO$ is a hydroxysubstituted acyl radical having 1 to 22 carbon atoms.

209. The composition according to anyone of the embodiments 201 to 208, wherein (D) is a N,N-dialkyl amide based on lactic acid, citric acid, tartaric acid, ricinoleic acid, 12-hydroxy stearic acid, or their mixtures.

210. The composition according to anyone of the embodiments 201 to 209, wherein (D) is a lactic acid N,N-dimethylamide.

211. The composition according to anyone of the embodiments 201 to 207, wherein in the general formula (III) of (D) $R^{31}CO$ does not contain a hydroxy group.

212. The composition according to anyone of the embodiments 201 to 207 and 211, wherein in the general formula (III) of (D) $R^{31}CO$ is an acyl radical having 6 to 12 carbon atoms.

213. The composition according to anyone of the embodiments 201 to 207 and 211 to 212, wherein (D) is selected from the group consisting of N,N-dimethyloctanamide, N,N-dimethylnonanamide, and N,N-dimethyldecanamide.

214. The composition according to anyone of the embodiments 201 to 207 and 211, wherein in the general formula (III) of (D) $R^{31}CO$ is an acyl radical having 1 to 3 carbon atoms.

215. The composition according to anyone of the embodiments 201 to 206, wherein in the general formula (III) of (D) $R^{32}$ and $R^{33}$ together with the nitrogen atom linking them define a 5- or 6-membered saturated or unsaturated heterocyclic radical which optionally comprises 1 or 2 further heteroatoms selected from the group consisting of nitrogen, oxygen, and sulfur.

216. The composition according to anyone of the embodiments 201 to 206 and 215, wherein in the general formula (III) of (D) $R^{32}$ and $R^{33}$ together with the nitrogen atom linking them define a 6-membered saturated heterocyclic radical which comprises one further oxygen heteroatom.

217. The composition according to anyone of the embodiments 201 to 206 and 215 to 216, wherein (D) is N-acetylmorpholine or N-formylmorpholine.

218. The composition according to anyone of the embodiments 201 to 206 and 215, wherein in the general formula (III) of (D) $R^{32}$ and $R^{33}$ together with the nitrogen atom linking them define a 5-membered saturated heterocyclic radical which comprises one further nitrogen heteroatom.

219. The composition according to anyone of the embodiments 201 to 206, 215, and 218, wherein (D) is 1,3-dimethyl-2-imidazolidinone.

220. The composition according to anyone of the embodiments 201 to 207, wherein in the general formula (III) of (D) $R^{32}$ is an acyloxy substituted alkyl group.

221. The composition according to anyone of the embodiments 201 to 207, wherein in the general formula (III) of (D) $R^{31}CO$ is an acyl radical having 1 to 4 carbon atoms, $R^{32}$ is an acyloxy substituted alkyl group and $R^{33}$ is $C_1$ to $C_4$ alkyl.

222. The composition according to anyone of the embodiments 201 to 207, wherein (D) is N-[2-(acetyloxy)ethyl]-N-methyl acetamide.

223. The composition according to embodiment 201, wherein
the mixture (A) comprises N-n-butylthiophosphoric acid triamide (NBPT) and/or N-n-propylthiophosphoric acid triamide (NPPT) and
(D) is an N,N-dialkyl amide based on lactic acid, citric acid, tartaric acid, ricinoleic acid, 12-hydroxy stearic acid, or their mixtures.

224. The composition according to anyone of the embodiments 201 to 223, further comprising
(B) an aromatic alcohol according to the general formula (II)

$R^{11}$—$C(R^{12})(R^{13})$—OH, wherein
$R^{11}$ is aryl or alkylaryl;
$R^{12}$ is H or alkyl;
$R^{13}$ is H or alkyl.

225. The composition according to embodiment 224, wherein in the general formula (II) of (B) $R^{12}$ and $R^{13}$ is H.

226. The composition according to anyone of the embodiments 224 to 225, wherein in the general formula (II) of (B) $R^{11}$ is aryl.

227. The composition according to anyone of the embodiments 224 to 226, wherein in the general formula (II) of (B) $R^{11}$ is phenyl.

228. The composition according to anyone of the embodiments 201 to 227, further comprising (B), wherein (B) is benzyl alcohol.

229. The composition according to anyone of the embodiments 201 to 228, further comprising
(C) at least one amine selected from the group consisting of
(C1) a polymeric polyamine, and
(C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$, and
(C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$, and
(C4) an amine containing at least one saturated or unsaturated $C_8$ to C40 alkyl group $R^{23}$, and
(C5) a saturated or unsaturated heterocyclic amine which contains at least one oxygen atom as ring atom and which does not contain a further alkoxy group.

230. The composition according to anyone of the embodiments 201 to 229, further comprising
(C) an amine which is
(C1) a polymeric polyamine.

231. The composition according to anyone of the embodiments 201 to 229, wherein (C1) is a polyalkylene imine.

232. The composition according to anyone of the embodiments 201 to 229, wherein (C1) is a polyethylene imine.

233. The composition according to anyone of the embodiments 201 to 229, further comprising
(C) an amine which is
(C2) an amine containing not more than one amino group and at least three alkoxy- or hydroxy-substituted $C_2$ to $C_{12}$ alkyl groups, wherein at least one of the groups $R^{21}$ is different to the other groups $R^{21}$.

234. The composition according to anyone of the embodiments 201 to 229, further comprising (C2) an amine containing not more than one amino group and at least three hydroxy-substituted $C_2$ to $C_3$ alkyl groups which are covalently bound to the amino group.

235. The composition according to anyone of the embodiments 201 to 229, further comprising (C2) an amine selected from the group consisting of Bis(hydroxyethyl)-isopropanolamine (DEIPA), and 1,1'-((2-Hydroxyethyl)imino)dipropan-2-ol.

236. The composition according to anyone of the embodiments 201 to 229, further comprising
(C) an amine which is
(C3) an amine containing not more than one amino group and at least two alkoxy- or hydroxy-substituted $C_2$ to $C_{12}$ alkyl groups, wherein at least one of said alkyl groups bears the alkoxy or hydroxy substituent at a secondary or tertiary carbon atom and wherein at least one of the groups $R^{22}$ is different to the other group(s) $R^{22}$.

237. The composition according to anyone of the embodiments 201 to 229, further comprising (C3) an amine selected from the group consisting of 1-((2-hydroxyethyl)amino)propan-2-ol, and N-Methyl-N-hydroxyethyl-isopropanolamine.
238. The composition according to anyone of the embodiments 201 to 229, further comprising
   (C) an amine which is
      (C4) an amine containing at least one saturated or unsaturated $C_8$ to C40 alkyl group $R^{23}$.
239. The composition according to anyone of the embodiments 201 to 229, further comprising (C4) an amine containing at least one saturated or unsaturated $C_8$ to $C_{19}$ alkyl group $R^{23}$.
240. The composition according to anyone of the embodiments 201 to 229, further comprising (C4) an amine selected from the group consisting of ethoxylated (2) cocoalkylamine, ethoxylated (5) cocoalkylamine, ethoxylated (15) cocoalkylamine, ethoxylated (2) oleylamine, lauryl-dimethylamine, oleyl-dimethylamine, and 2-propylheptylamine ethoxylate (5 EO), 2-propylheptylamine ethoxylate (10 EO), and 2-propylheptylamine ethoxylate (20 EO).
241. The composition according to anyone of the embodiments 201 to 229, further comprising
   (C) an amine which is
      (C5) a saturated or unsaturated heterocyclic amine which contain at least one oxygen atom as ring atom and which do not contain a further alkoxy group.
242. The composition according to anyone of the embodiments 201 to 229, further comprising (C5) an amine which is N-methyl morpholine.
243. The composition according to anyone of the embodiments 201 to 242, further comprising (E) an alcohol comprising at least two hydroxy groups which are not dissociable in the aqueous medium.
244. The composition according to anyone of the embodiments 201 to 242, further comprising (E) propane-1,2-diol (alpha-propylene glycol).
245. The composition according to anyone of the embodiments 201 to 244, further comprising a compound (K) selected from the group consisting of
   (K1) an amine selected from the group consisting of methyldiethanolamine, tetrahydroxy-propylethylenediamine, trimethylaminoethylethanolamine, N,N,N'N'-tetramethyl-1,6-hexanediamine, N,N',N''-tris(dimethylaminopropyl)hexahydrotriazine, and 2,2'-dimorpholinyldiethyl ether,
   (K2) an amine containing not more than one amino group and at least three alkoxy- or hydroxy-substituted $C_2$ to $C_{12}$ alkyl groups $R^{41}$, wherein all groups $R^{41}$ within said amine are identical, and
   (K3) an amine containing not more than one amino group and at least two alkoxy- or hydroxy-substituted $C_2$ to $C_{12}$ alkyl groups $R^{42}$, wherein at least one of the groups $R^{42}$ bears the alkoxy or hydroxy substituent at a secondary or tertiary carbon atom and wherein all groups $R^{42}$ with said amine are identical.
246. The composition according to anyone of the embodiments 201 to 245, further comprising (F) a nitrogen-containing fertilizer.
247. The composition according to anyone of the embodiments 201 to 245, further comprising (F1) a urea-containing fertilizer comprising at least one component selected from the group consisting of urea, urea ammonium nitrate (UAN), isobutylidene diurea (IBDU), crotonylidene diurea (CDU) and urea formaldehyde (UF), urea-acetaldehyde, and urea-glyoxal condensates.
248. The composition according to anyone of the embodiments 201 to 245, further comprising (F) a nitrogen-containing fertilizer which comprises urea.
249. Process for treating the soil comprising:
   applying the composition according to anyone of the embodiments 201 to 248 into the soil in-furrow and/or as side-dress and/or as broadcast.
250. Process according to embodiment 249 comprising:
   applying the composition by spraying it onto the soil.
251. Process according to embodiment 249, wherein the composition is—either at the same time or with a time difference—applied together with at least one nitrogen-containing fertilizer (F) into the soil in-furrow and/or as side-dress and/or as broadcast.
252. Use of the composition according to anyone of the embodiments 201 to 245 as additive or coating material for nitrogen-containing fertilizers (F).

The invention claimed is:
1. A composition comprising:
(A) A mixture comprising at least one (thio)phosphoric acid triamide according to the general formula (I)

$R^1R^2NP(X)(NH_2)_2$, wherein
X is oxygen or sulfur;
$R^1$ is a $C_1$ to $C_{20}$ alkyl, $C_3$ to $C_{20}$ cycloalkyl, $C_6$ to $C_{20}$ aryl, or dialkylaminocarbonyl group;
$R^2$ is H, or
$R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
and
(C) at least one amine selected from the group consisting of
   (C1) a polymeric polyamine, and
   (C2) an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$, and
   (C3) an amine containing not more than one amino group and at least two alkoxy- or hydroxy-substituted $C_2$ to $C_{12}$ alkyl groups $R^{22}$, wherein at least one of the groups $R^{22}$ bears the alkoxy or hydroxy substituent at a secondary or tertiary carbon atom and wherein at least one of the groups $R^{22}$ is different to the other group(s) $R^{22}$, and
   (C4) an amine containing at least one saturated or unsaturated $C_8$ to $C_{40}$ alkyl group $R^{23}$, and
   (C5) a saturated or unsaturated heterocyclic amine which contains at least one oxygen atom as ring atom and which does not contain a further alkoxy group.
2. The composition according to claim 1, wherein the mixture (A) comprises N-n-butylthiophosphoric acid triamide (NBPT) or N-n-propylthiophosphoric acid triamide (NPPT).
3. The composition according to claim 1, wherein the at least one amine is a polymeric polyamine.
4. The composition according to claim 1, wherein the at least one amine is a polyalkylene imine.
5. The composition according to claim 1, wherein the at least one amine is a polyethylene imine.

6. The composition according to claim 1, wherein the at least one amine is an amine containing not more than one amino group and at least three alkoxy- or hydroxy-substituted $C_2$ to $C_{12}$ alkyl groups $R^{21}$, wherein at least one of the groups $R^{21}$ is different to the other groups $R^{21}$.

7. The composition according to claim 1, wherein the at least one amine is
selected from the group consisting of bis(hydroxyethyl)-isopropanolamine (DEIPA), and 1,1'-((2-hydroxyethyl)imino)dipropan-2-ol.

8. The composition according to claim 1, wherein the at least one amine is an amine containing not more than one amino group and at least two alkoxy- or hydroxy-substituted $C_2$ to $C_{12}$ alkyl groups $R^{22}$, wherein at least one of said alkyl groups bears the alkoxy or hydroxy substituent at a secondary or tertiary carbon atom and wherein at least one of the groups $R^{22}$ is different to the other group(s) $R^{22}$.

9. The composition according to claim 1, wherein the at least one amine is selected from the group consisting of 1-((2-hydroxyethyl)amino)propan-2-ol, and N-Methyl-N-hydroxyethyl-isopropanolamine.

10. The composition according to claim 1, wherein the at least one amine is an amine containing at least one saturated or unsaturated $C_8$ to $C_{40}$ alkyl group $R^{23}$.

11. The composition according to claim 1, wherein the at least one amine is selected from the group consisting of ethoxylated (2) cocoalkylamine, ethoxylated (5) cocoalkylamine, ethoxylated (15) cocoalkylamine, ethoxylated (2) oleylamine, lauryl-dimethylamine, oleyl-dimethylamine, and 2-propylheptylamine ethoxylate (5 EO), 2-propylheptylamine ethoxylate (10 EO), and 2-propylheptylamine ethoxylate (20 EO).

12. The composition according to claim 1, further comprising (D) at least one amide according to the general formula (III)

wherein
$R^{31}CO$ is an acyl radical having 1 to 22 carbon atoms;
$R^{32}$ is H or alkyl, and
$R^{33}$ is H or alkyl, or
$R^{32}$ and $R^{33}$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.

13. The composition according to claim 1, wherein at least one amide is a N,N-dialkyl amide based on lactic acid, citric acid, tartaric acid, ricinoleic acid, 12-hydroxy stearic acid, or their mixtures.

14. The composition according to claim 1, further comprising (E) an alcohol comprising at least two hydroxy groups which are not dissociable in the aqueous medium.

15. The composition according to claim 1, further comprising (E) propane-1,2-diol (alpha-propylene glycol).

16. A composition comprising:
(A) a mixture comprising at least one (thio)phosphoric acid triamide according to the general formula (I)

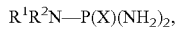

wherein
X is oxygen or sulfur;
$R^1$ is a $C_1$ to $C_{20}$ alkyl, $C_3$ to $C_{20}$ cycloalkyl, $C_6$ to $C_{20}$ aryl, or dialkylaminocarbonyl group;
$R^2$ is H, or
$R^1$ and $R^2$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur,
and
(D) at least one amide according to the general formula (III)

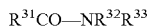

wherein
$R^{31}CO$ is an acyl radical having 1 to 22 carbon atoms;
$R^{32}$ is H or alkyl, and
$R^{33}$ is H or alkyl, or
$R^{32}$ and $R^{33}$ together with the nitrogen atom linking them define a 5- or 6-membered saturated or unsaturated heterocyclic radical, which optionally comprises 1 or 2 further heteroatoms selected from the group consisting of nitrogen, oxygen, and sulfur.

17. The composition according to claim 16, wherein the mixture (A) comprises N-n-butylthiophosphoric acid triamide (NBPT) and/or N-n-propylthiophosphoric acid triamide (NPPT).

18. The composition according to claim 16, wherein, in the general formula (III) of (D), $R^{31}CO$ is a hydroxysubstituted acyl radical having 1 to 22 carbon atoms.

19. The composition according to claim 16, wherein (D) is a N,N-dialkyl amide based on lactic acid, citric acid, tartaric acid, ricinoleic acid, 12-hydroxy stearic acid, or their mixtures.

20. The composition according to claim 16, wherein (D) is a lactic acid N,N-dimethylamide.

* * * * *